United States Patent [19]

Shigematsu et al.

[11] Patent Number: 5,185,825
[45] Date of Patent: Feb. 9, 1993

[54] OPTICAL SWITCHING CONNECTOR

[75] Inventors: Takashi Shigematsu; Seiichi Imamizo; Koichi Takagi; Toshihiko Ohta; Jun Yamakawa, all of Ichihara, Japan

[73] Assignee: The Furukawa Electric Co., Ltd., Tokyo, Japan

[21] Appl. No.: 767,943

[22] Filed: Sep. 30, 1991

[51] Int. Cl.$^5$ .......................... G02B 6/00; G02B 6/36
[52] U.S. Cl. .................................................. 385/20
[58] Field of Search ............................... 385/15, 19-21

[56] References Cited

U.S. PATENT DOCUMENTS

| | | | |
|---|---|---|---|
| 4,407,562 | 10/1983 | Young | 385/20 |
| 4,568,143 | 2/1986 | Yamada et al. | 385/22 X |
| 4,607,910 | 8/1986 | Thurenius | 385/20 X |
| 4,989,946 | 2/1991 | Williams et al. | 385/16 |

FOREIGN PATENT DOCUMENTS

| | | |
|---|---|---|
| 0459776 | 12/1991 | European Pat. Off. |
| 63-85522 | 9/1986 | Japan |
| WO-A9111744 | 8/1991 | World Int. Prop. O. |

OTHER PUBLICATIONS

Shigematsu et al, "SM-CBL Transferable Connector", IEICE, Aug. 14, 1991, Tokyo, Japan.
Transactions of the Institute of Electronics and Communication vol. E70, No. 8, Aug. 8, 1987, Tokyo JP pp. 696-690; S. Nagasawa: 'a new type of optical switch with a plastic molded ferrule'.
Patent Abstracts of Japan, vol. 12, No. 319 (P-751) (3166) Aug. 30, 1988.
Patent Abstracts of Japan, vol. 12, No. 441 (P-789) (3288) Nov. 21, 1988.

Primary Examiner—Akm E. Ullah
Attorney, Agent, or Firm—Armstrong, Nikaido, Marmelstein, Kubovcik & Murray

[57] ABSTRACT

Disclosed in an optical switching connector provided with a first and second ferrule disposed with end faces thereof abutting on each other and two reference pins disposed in parallel at a predetermined interval. The first and second ferrules have two parallel pin holes, respectively. The two reference pins are inserted in the pin holes. The pin holes have an elongated sectional shape enabling the reference pins to move laterally by exactly a certain movement pitch. The first and second ferrules are able to be positioned at one position determined by one of the inside surfaces of the pin holes being pressed against the reference pins and another position determined by the other inside surfaces of the pin holes being pressed against the reference pins. One of the first and second ferrules has fixed in it two or more optical fibers at a pitch of 1/n (n being a positive integer) of the above-mentioned certain movement pitch, while the other ferrule has fixed in it one or more optical fibers so to correspond with all or part of the same.

13 Claims, 21 Drawing Sheets (a)

(b)

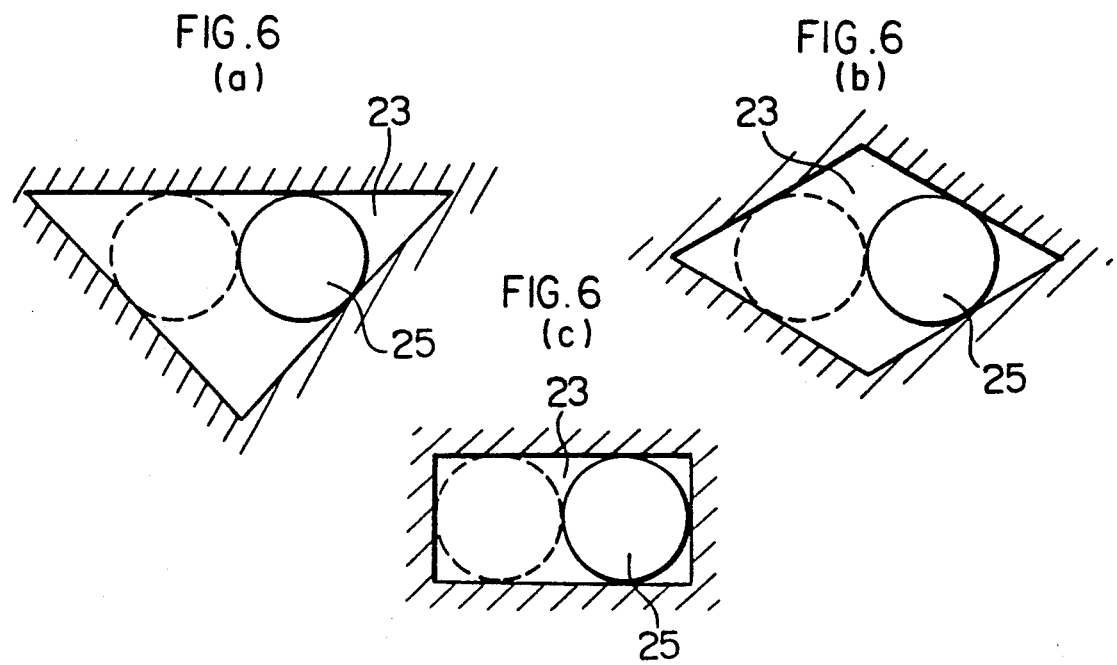
FIG. 6 (a)
FIG. 6 (b)
FIG. 6 (c)
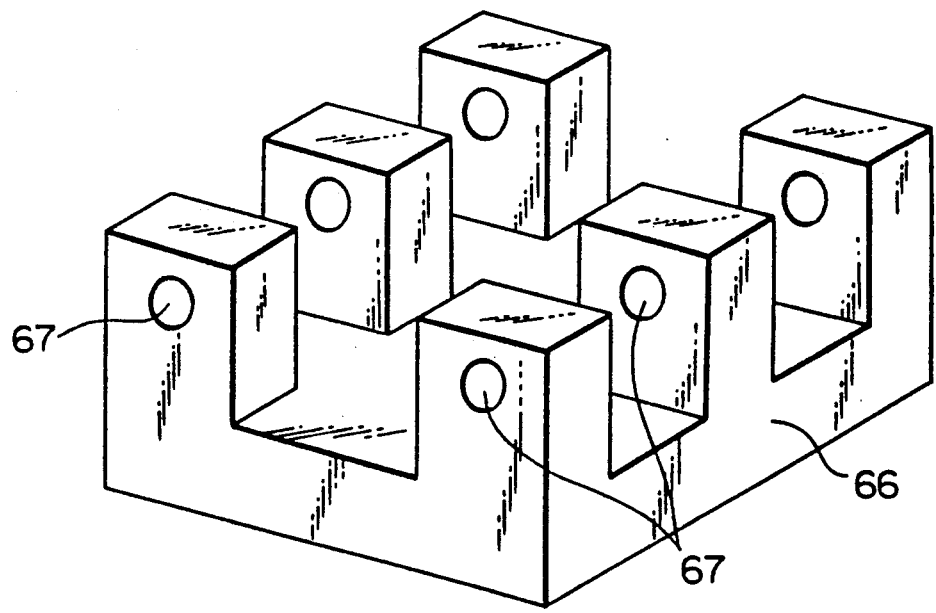
FIG. 7

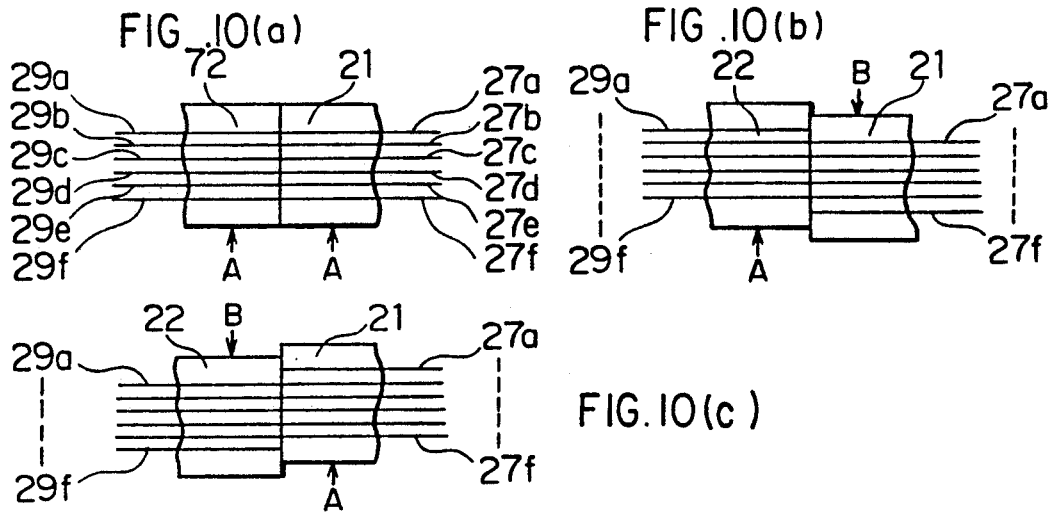
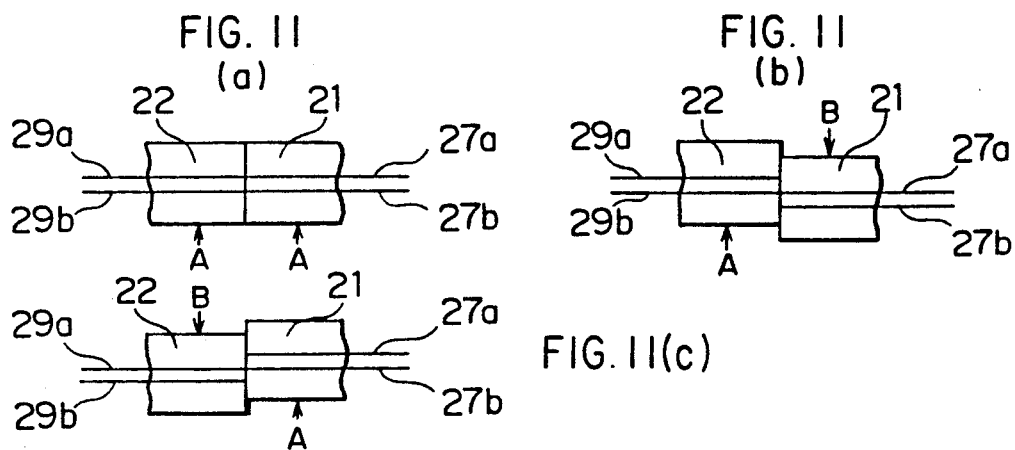
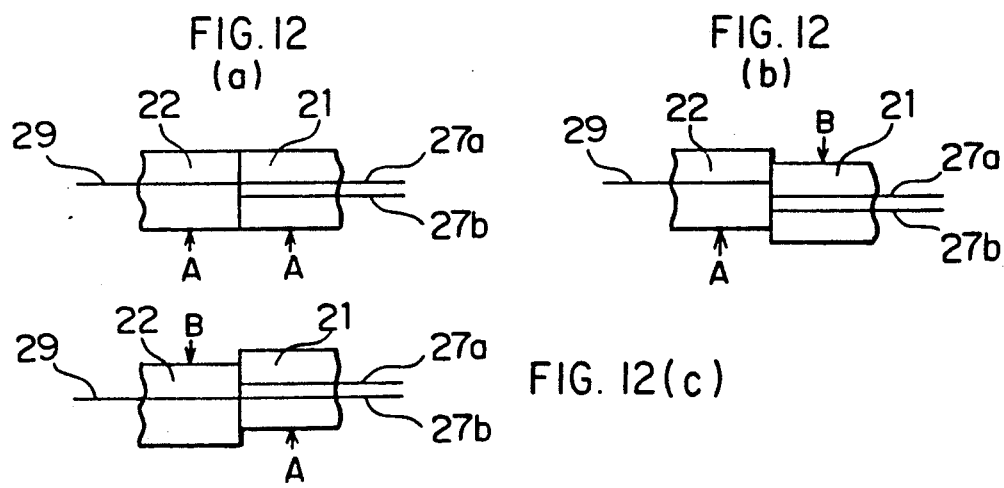

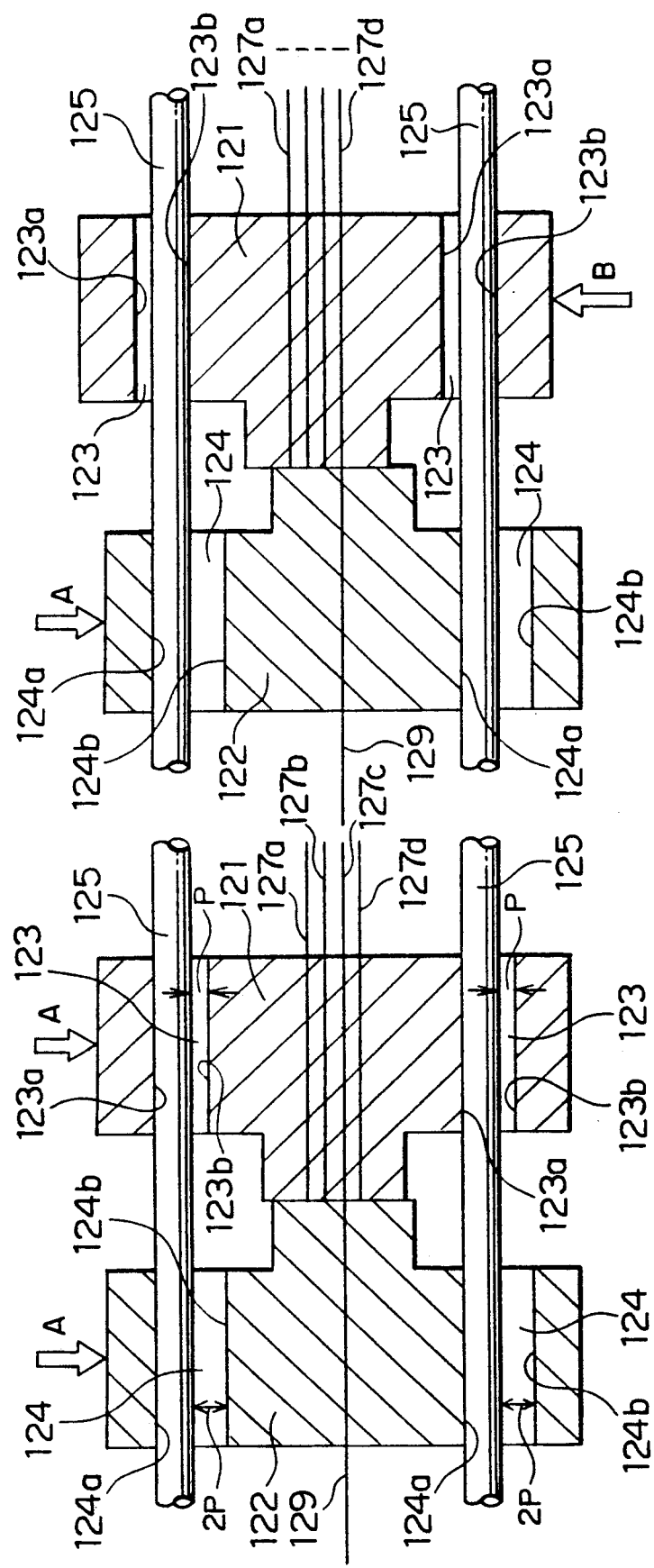

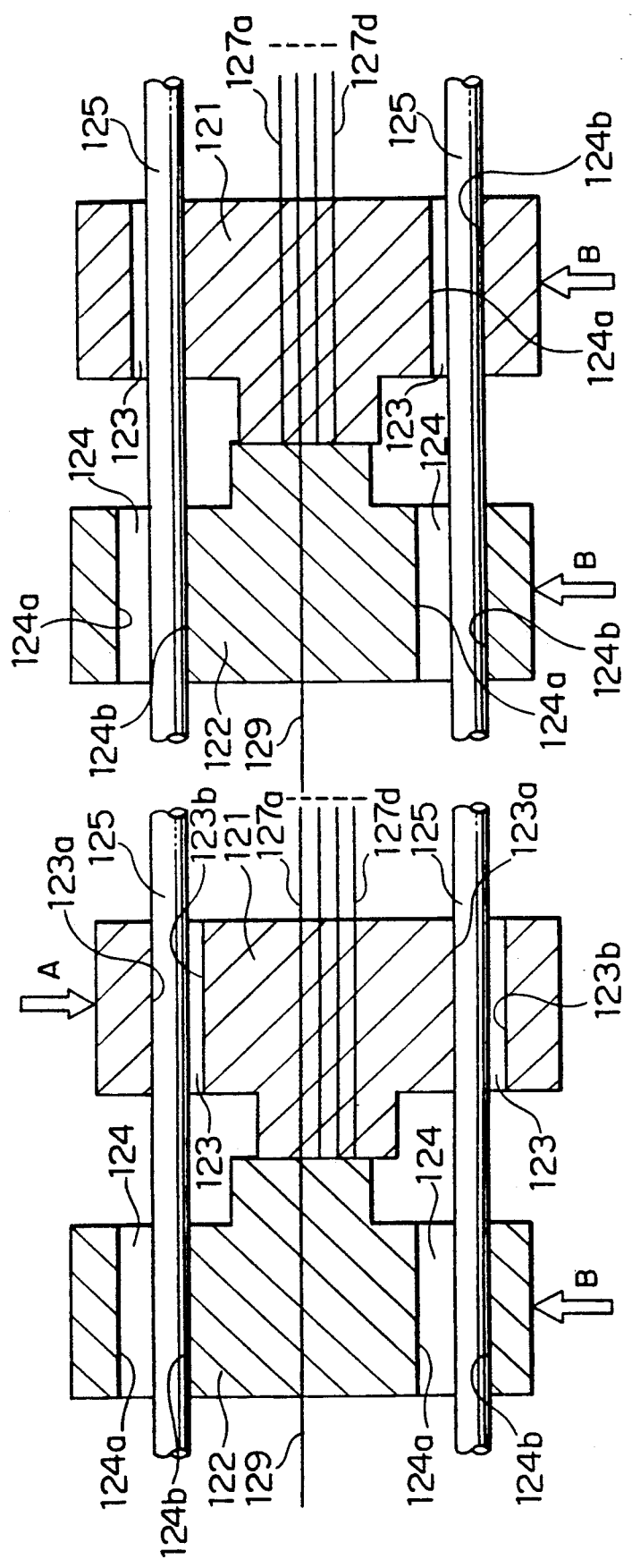

(a)

(b)

(a)

(b)

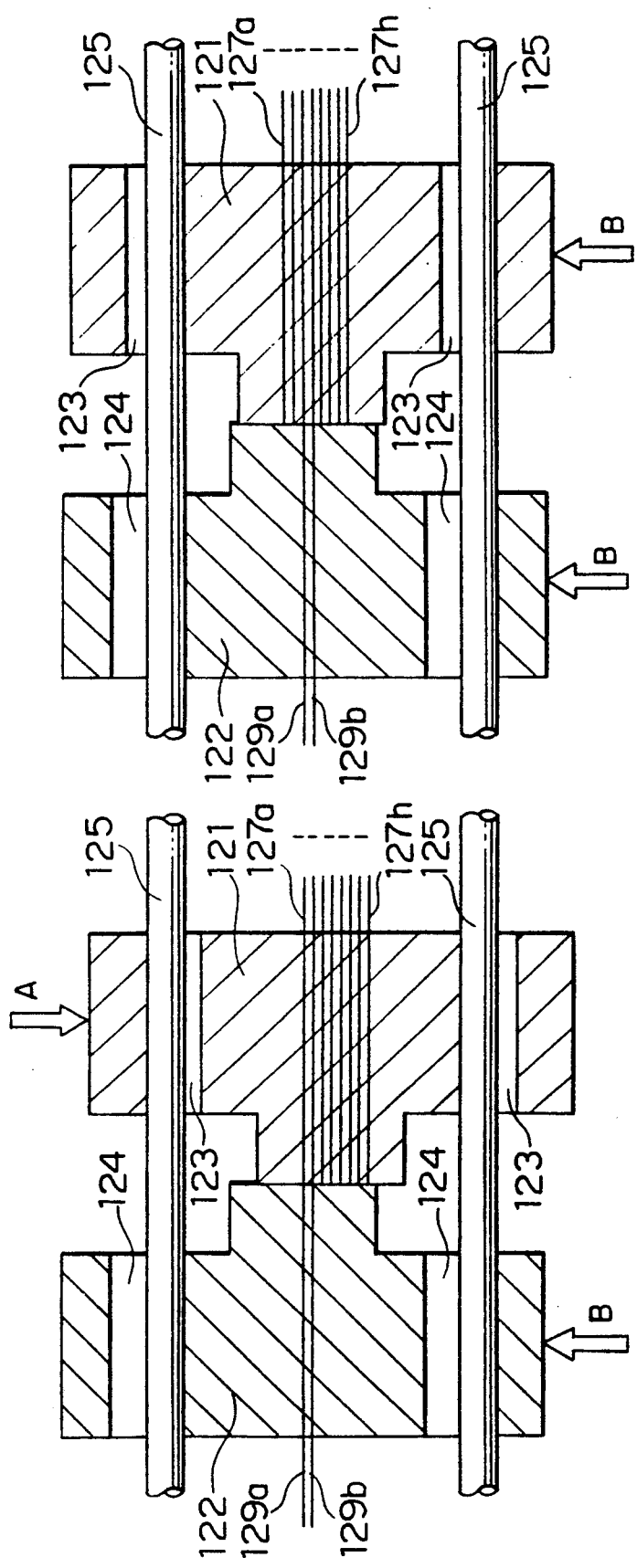

OPTICAL SWITCHING CONNECTOR

BACKGROUND OF THE INVENTION

1. Field of the Invention

The present invention relates to an optical switching connector used for switching optical paths of an optical fiber line, more particularly relates to an optical switching connector able to switch optical paths in multiple stages of three of four stages.

2. Description of the Related Art

In the prior art, there has been known, as an optical switching connector used for switching the optical paths of an optical fiber line, an optical switching connector such as shown in FIGS. 24(a) and (b) (Japanese Unexamined Published Patent Application (Kokai) No. 63-85522).

This optical switching connector has a first ferrule 11 and a second ferrule 12 disposed with end faces thereof abutting on each other. The first ferrule 11 has two parallel pin holes 13 and the second ferrule 12 has corresponding parallel pin holes 14. In the corresponding pin holes 13 and 14 are inserted reference pins 15 so as to bridge the two ferrules 11 and 12. The pin holes 13 of the first ferrule 11 are formed in a size allowing the reference pins 15 to fit in without clearance, while the pin holes 14 of the second ferrule 12 are formed to have an elongated sectional shape so as to allow the reference pins 15 to move laterally by a certain pitch P.

Between the two pin holes 13 of the first ferrule 11, for example, four optical fibers 17a to 17d incorporated in a four-core tape-like cable 16 are affixed with the end faces exposed. Further, between the two pin holes 14 of the second ferrule 12, for example, two optical fibers 19a and 19b of a two-core tape-like cable 18 are affixed with the end faces exposed.

If the first ferrule 11 is fixed in place and the second ferrule 12 can move laterally (reverse also possible), in the state with a force applied in the arrow A direction to the second ferrule 12 as shown in (a) in the figure, the two optical fibers 19a and 19b of the second ferrule 12 are connected as optical paths with the two optical fibers 17a and 17b of the first ferrule 12. After this, if a force in the direction of the arrow B is applied to the second ferrule 12 as shown in (b) of the figure, the ferrule 12 moves laterally and the optical fibers 19a and 19b of the ferrule 12 are connected as optical paths with the two optical fibers 17c and 17d of the first ferrule 11.

In this optical switching connector, the optical paths are switched in the above way.

This type of optical switching connector is simple in construction, so has the advantages of being relatively easy to manufacture and being low in cost, but since the first ferrule and the second ferrule can only oppose each other in two relative positions, switching is possible in only two stages and therefore there was the problem of limited application.

SUMMARY OF THE INVENTION

The present invention, in consideration of the above problem in the related art, has as its object the provision of an optical switching connector which can switch the optical paths of optical fibers in multiple stages of three or four stages by a simple operation and which thus enable complicated switching of optical paths.

To achieve this object, the first optical switching connector of the present invention is provided with a first and second ferrule disposed with end faces thereof abutting on each other and two reference pins disposed in parallel at a predetermined interval, the first and second ferrules having two parallel pin holes, respectively, the two reference pins being inserted in the pin holes, the pin holes having an elongated sectional shape enabling the reference pins to move laterally by exactly a certain movement pitch, the first and second ferrules being able to be positioned at one position determined by one of the inside surfaces of the pin holes being pressed against the reference pins and another position determined by the other inside surfaces of the pin holes being pressed against the reference pins, one of the first and second ferrules having two or more optical fibers affixed to it at a pitch of 1/n (n being a positive integer) of the above-mentioned certain movement pitch, the other ferrule having one or more optical fibers affixed to it so to correspond with all or part of the same.

The movement pitch of the reference pins in the pin holes formed in the first ferrule and the movement pitch of the reference pins in the pin holes formed in the second ferrule preferably are the same.

In the optical switching connector, the first ferrule and the second ferrule may face each other in the following three positions:

(1) State where one of the inside surfaces of the pin holes (or the other inside surfaces) of both the first and second ferrules are pressed against the reference pins.

(2) State where one of the inside surfaces of the pin holes of the first ferrule are pressed against the reference pins and the other inside surfaces of the pin holes of the second ferrule are pressed against the reference pins.

(3) State where the other inside surfaces of the pin holes of the first ferrule are pressed against the reference pins and the one inside surfaces of the pin holes of the second ferrule are pressed against the reference pins.

Therefore, the first optical switching connector can switch the optical paths in three stages.

According to the first optical switching connector of the present invention, it is possible to obtain an optical switching connector able to switch the optical paths of the optical fibers in three stages swiftly by a simple operation and therefore there is the remarkable effect of enabling switching of complicated optical paths with ease by an inexpensive apparatus, compared with the prior art.

The second optical switching connector of the present invention is provided with a first and second ferrule disposed with end faces thereof abutting on against each other and two reference pins disposed in parallel at a predetermined interval, the first and second ferrule having two parallel pin holes, respectively, the two reference pins being inserted in the pin holes, the pin holes having an elongated sectional shape enabling the ferrules to move laterally by a certain movement pitch with respect to the reference pins, the first and second ferrules being above to be positioned at one position determined by one of the inside surfaces of the pin holes being pressed against the reference pins and another position determined by the other inside surfaces of the pin holes being pressed against the reference pins, one of the first and second ferrules having three or more optical fibers affixed to it at a pitch of 1/n (n being a positive integer) of the certain movement pitch, the other ferrule having one or more optical fibers affixed to it so as to oppose all or part of the same.

The movement pitch of the reference pins in the pin holes formed in the first ferrule and the movement pitch of the reference pins in the pin holes formed in the second ferrule preferably are different.

In the second optical switching connector, the first ferrule and the second ferrule may face each other in the following four positions:

(1) State where one of the inside surfaces of the pin holes of both the first and second ferrules are pressed against the reference pins.

(2) State where one of the inside surfaces of the pin holes of the first ferrule are pressed against the reference pins and the other inside surfaces of the pin holes of the second ferrule are pressed against the reference pins.

(3) State where the other inside surfaces of the pin holes of the first ferrule are pressed against the reference pins and the one inside surfaces of the pin holes of the second ferrule are pressed against the reference pins.

(4) State where the other of the inside surfaces of the pin holes of both the first and second ferrules are pressed against the reference pins.

Therefore, the second optical switching connector can switch the optical paths in four stages.

According to the second optical switching connector of the present invention, it is possible to obtain an optical switching connector able to switch the optical paths of the optical fiber in four stages swiftly by a simple operation and therefore there if the remarkable effect of enabling switching of complicated optical paths with ease by an inexpensive apparatus, compared with the prior art.

BRIEF DESCRIPTION OF THE DRAWINGS

FIGS. 6(a) to (c) are sectional views showing other examples of the shapes of pin holes of a ferrule used in the present invention.

FIG. 7 is a perspective view showing another example of a support table used in the present invention.

FIGS. 9(a) to (c), FIGS. 10(a) to (c), FIGS. 11(a) to (c), and FIGS. 12(a) to (c) are explanatory views showing other examples of the switching pattern of an optical switching connector according to the present invention.

FIGS. 13(a) to (d) are explanatory views showing a switching pattern of an optical switching connector according to another embodiment of the present invention.

FIGS. 19(a) to (d), FIGS. 20(a) to (d), FIGS. 21(a) to (d), FIGS. 22(a) to (d), and FIGS. 23(a) to (d) are explanatory views showing other examples of the switching pattern of the optical switching connector according to the present invention, and FIGS. 24(a) and (b) are explanatory views showing the switching pattern of a conventional optical switching connector.

DESCRIPTION OF THE PREFERRED EMBODIMENTS

Below, a detailed explanation will be made of embodiments of the present invention with reference to the drawings.

The optical switching connector of the embodiment shown in FIGS. 1(a) to (d) is provided with a first ferrule 21 and second ferrule 22 disposed with end faces thereof abutting on each other and two reference pins 25 disposed in parallel at a predetermined interval.

Figure 3:
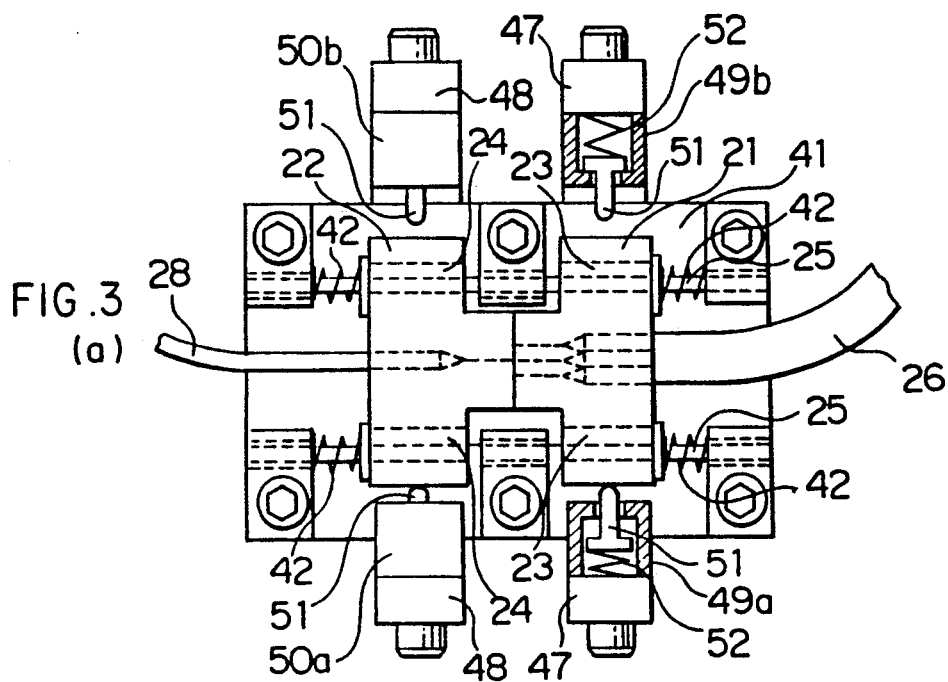
FIGS. 3(a) to (c) are a plan view, side view, and rear view of the overall construction of the above-mentioned optical switching connector including the drive system.
Figure 3:
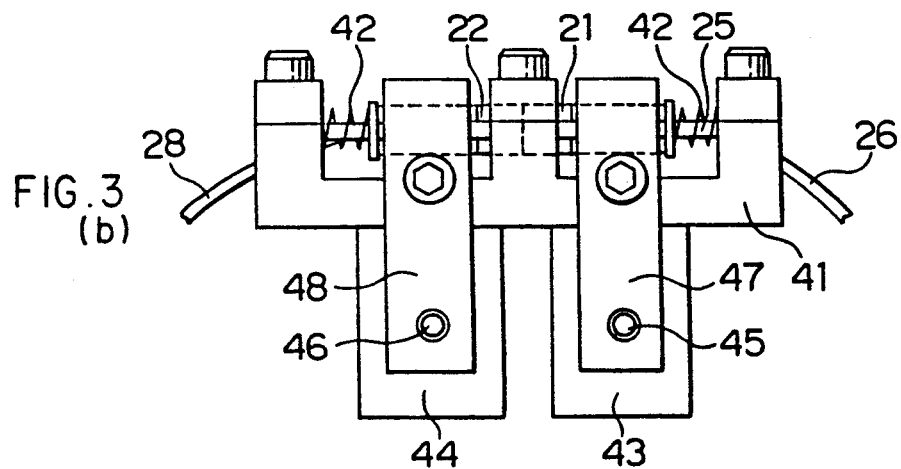
Figure 3:
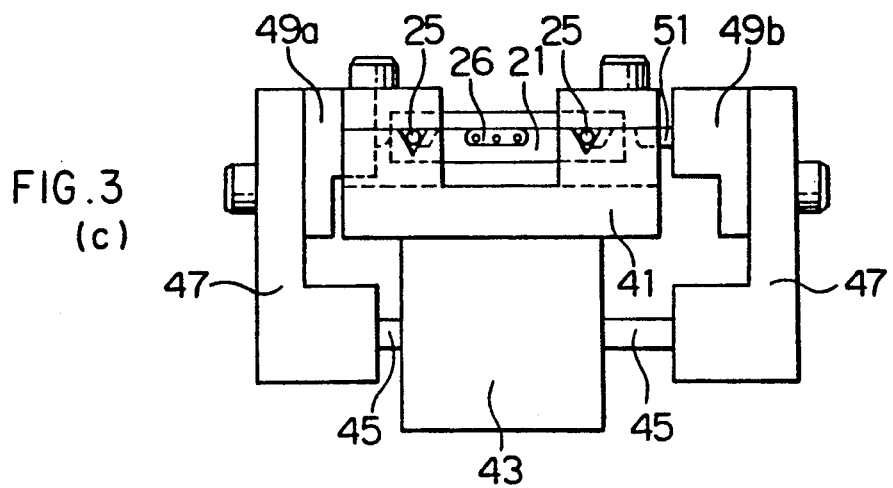

The first and second ferrules 21 and 22 each have two parallel pin holes 23 and 24, in which the two reference pins 25 are inserted. All of the pin holes 23 and 24 are elongated in sectional shape so as to allow the ferrules 21 and 22 to move laterally with respect to the reference pins 25 by a certain pitch P. The two reference pins 25 are fixed to a support table 41 as shown in FIGS. 3, for example.

The first ferrule 21 has affixed to it three optical fibers 27a and 27c, incorporated in a three-core tape-like cable 26, at the same pitch as the movement pitch P of the reference pins 25 in the pin holes 23 and 24. The second ferrule 22 has affixed to it a single optical fiber 29, incorporated in a single core fiber cable 28, so as to oppose the cable 26.

Figure 1A:
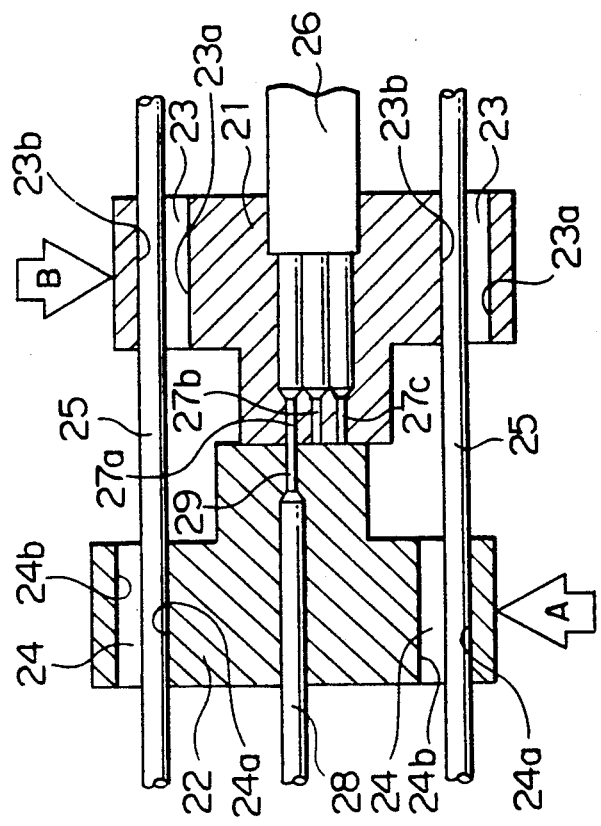
FIGS. 1(a) to (d) are explanatory views showing the switching pattern of an optical switching connector according to one embodiment of the present invention.

The positional relationship of the optical fibers 27a to 27c and the optical fiber 29, as shown in FIG. 1(a), is such that when the first and second ferrules 21 and 22 are pushed in the direction of the arrow A and one of the inside surfaces 23a and 24a of the pin holes 23 and 24 are pressed against the reference pins 25 in position, the optical axes of the optical fiber 29 and the optical fiber 27b coincide.

Figure 1B:
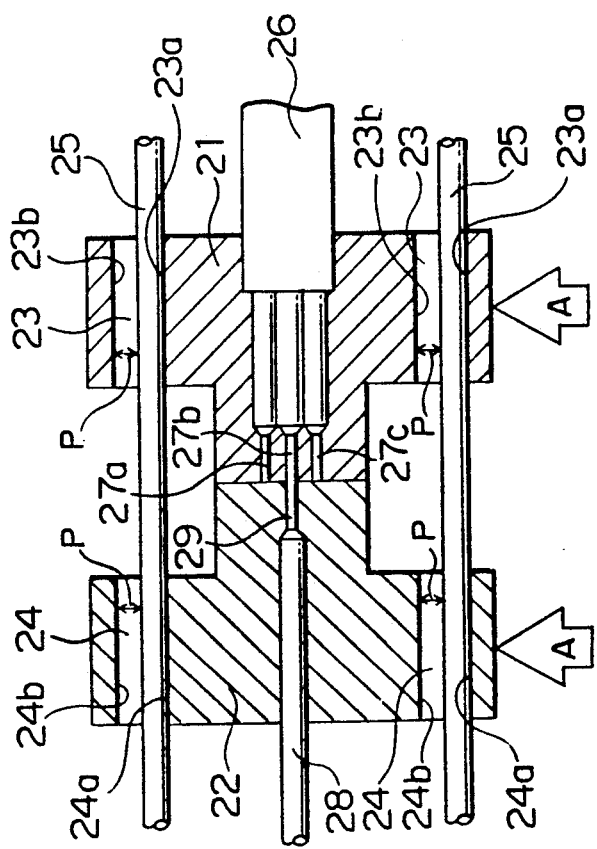
Figure 1C:
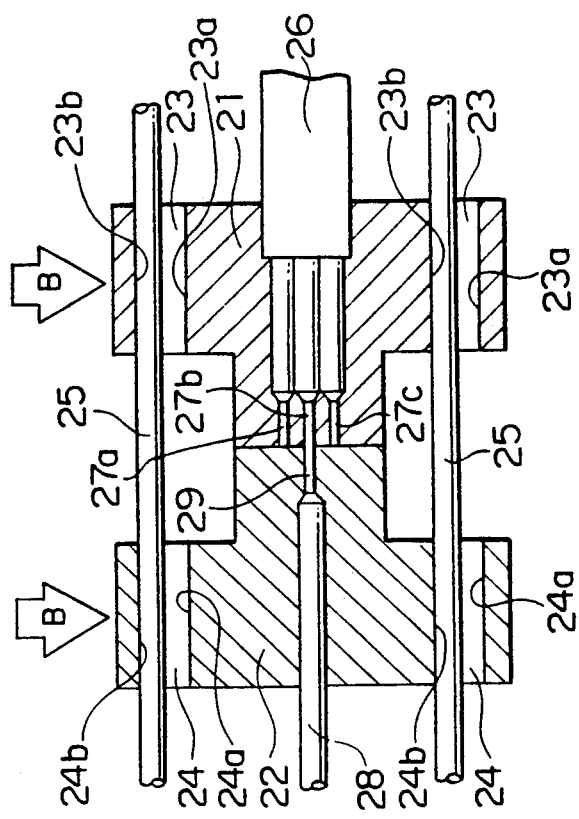

When, as shown in FIG. 1(b) just the first ferrule 21 is pressed in the direction of the arrow B from this state, the first ferrule 21 moves laterally by exactly the predetermined pitch P, the other inside surfaces 23b of the pin holes 23 are pressed against the reference pins 25, and the position is thus set. In this state, the optical fiber 29 coincides in optical axis with the optical fiber 27a.

Further, as shown in (c) of the figure, when just the second ferrule 22 is pushed in the direction of the arrow B from the state of FIG. 1(a), the second ferrule 22 moves laterally by exactly the predetermined pitch P, the other inside surfaces 24b of the pinholes 24 are pressed against the reference pins 25, and the position is thus set. In this state, the optical fiber 29 coincides in optical axis with the optical fiber 27c.

Figure 1D:
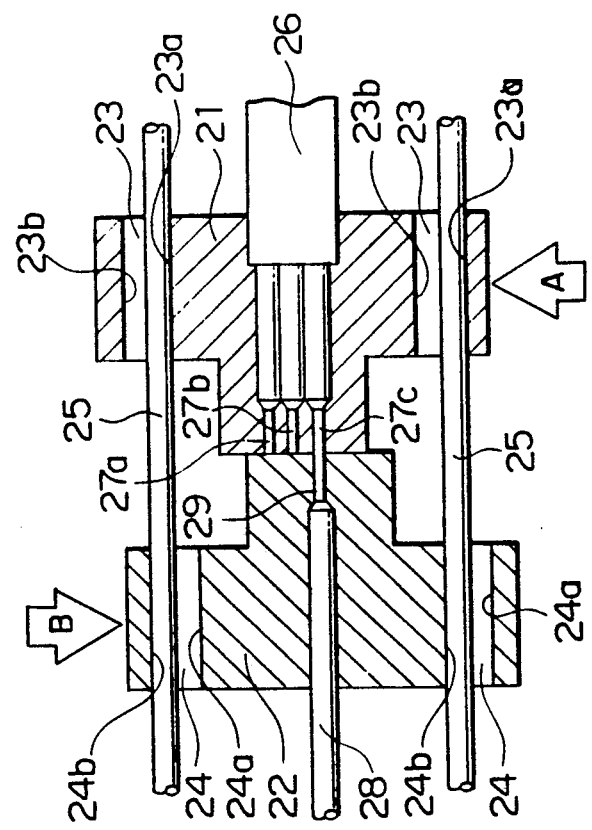

When, as shown in FIG. 1(d), the first ferrule 21 is pressed in the direction of the arrow B from the state of (c) of the figure, the first ferrule 21 moves laterally by exactly the predetermined pitch P, the other inside surfaces 23b of the pin holes 23 are pressed against the reference pins 25 and the position is thus set. In this state, the optical fiber 29 coincides in optical axis with the optical fiber 27b. This is the same state of connection as in FIG. 1(a), so in the actual switching operation, either one of the states shown in FIGS. (a) and (d) may be used.

The optical switching connector of the present invention can switch the optical paths in the three stages as explained above.

A specific example of the ferrule used in the optical switching connector of the present invention will be explained here with reference to FIGS. 2(a) and (b). Here, the explanation will be made of the first ferrule, but the second ferrule has substantially the same construction as this.

The ferrule 21 is comprised of a base plate 31 and a center cover plate 32 and two side cover plates 33 fixed adhered to the top of the plate 31. The base plate 31 has three V-shaped grooves 34 in the top center portion and has trapezoidal grooves 35 formed in parallel at the two sides thereof. The V-shaped grooves 34 have three optical fibers 27a to 27c of a tape-like cable 26 laid in them and are covered by the center cover plate 32 affixed and adhered at the top. This enables the three optical fibers 27a to 27c to be affixed in a certain position. Further, the portions of the base plate 31 where the trapezoidal grooves 25 are formed have the two side cover plates 33 affixed adhered to the top. The pin holes 23 are defined by the two side cover plates 22 and the trapezoidal grooves 35.

The pin holes 23 have reference pins 25 inserted in them as shown in FIG. 2(b). The reference pins 25 can move laterally relative to the ferrule 21 in the pin holes 23. The center distance L between the two pin holes 23 is formed so as to accurately match the center distance l of the two reference pins 25. Further, the range of possible movement of the reference pins 25 in the pin holes 23 is designed to be within the range of a predetermined pitch P from the position (solid line) where the reference pins 25 abut against one of the inside surfaces 23a of the pin holes 23 to the position where they abut against the other of the inside surfaces 23b (broken line). The three V-shaped grooves 34 are formed on the base plate 31 at a pitch the same as this.

The base plate 31 is formed, for example, by superfinishing grinding of ceramic or carbide allow, by chemical etching of silicon monocrystalline substrates, etc. since a particularly high dimensional precision is required.

FIGS 3(a) to (c) show the overall construction of an optical switching connector including the driving system of the first and second ferrules.

The two reference pins 25 inserted in the pin holes 23 and 24 of the first and second ferrules 21 and 22 are fixed and supported at the two ends and the center portion to a support table 41. Further, the rear end faces of the first and second ferrules 21 and 22 and the two side support portions of the support table 41 have inserted between them compression type coil springs 42. The two ferrules 21 and 22 are made to press against each other at the front end faces by the repulsion force of the springs 42.

On the other hand, at the bottom of the support table 41 are affixed first and second solenoids 43 and 44 corresponding to the first and second ferrules 21 and 22. These solenoids 43 and 44 are bi-stable type solenoids where plungers 45 and 46 move back and forth in a direction perpendicular to the reference pins 25. A the two ends of the plungers 45 and 46 are affixed rising pieces 47 and 48. At the top end portions of the rising pieces 47 and 48 are affixed push heads 49a, 49b, 50a, and 50b which push the side surfaces of the ferrules 21 and 22. The push heads 49a, 49b, 50a, and 50b have forward and reverse movable push pins 51, which push pins 51 are biased in the forward direction at all times by the compression springs 52 in the push heads.

The reciprocal movement stroke of the plungers 45 and 46 of the solenoids 43 and 44 is set to an extent so that when the push head 49a and 50a push the ferrules 21 and 22, their push pins 51 pull back to the intermediate position and conversely when the push heads 49b and 50b push the ferrules 21 and 22, their push pins 51 pull back to the intermediate position.

In FIGS. 3(a), the push heads 49a and 50a push the ferrules 21 and 22, giving the same state as in FIG. 1(a). If the first solenoid 43 is operated in the reverse direction from this state, then the push head 49b will push the first ferrule 21 from the opposite side and move the same laterally, so the state of FIG. 1(b) will result. Further if the second solenoid 44 is operated in the reverse direction from the state of FIG. 3(a), the push head 50b will push the second ferrule from the opposite side and move the same laterally, so the state of FIG. 1(c) will result.

The optical switching connector switches in three stages as mentioned above.

Figure 4:
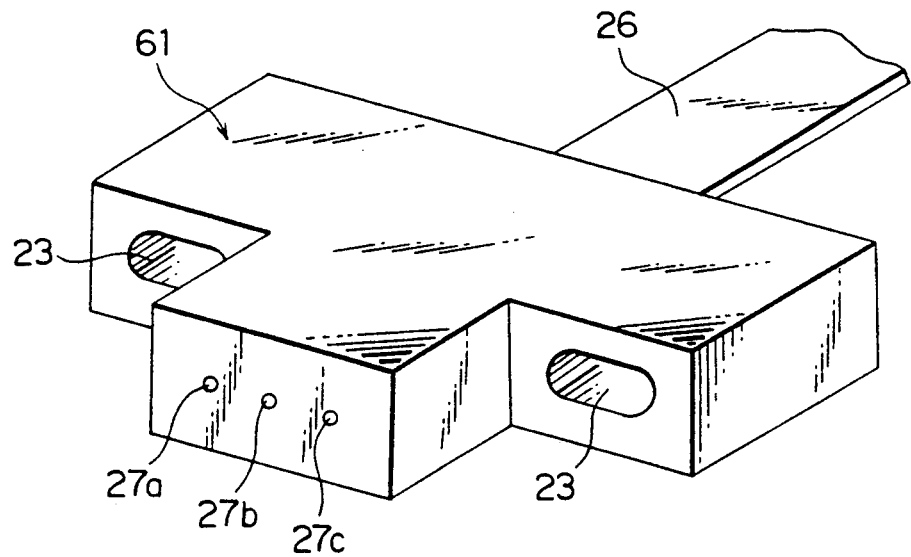
FIG. 4 and FIG. 5 are perspective views showing other examples of a ferrule used in the present invention.

FIG. 4 shows another example of the ferrule used in the optical switching connector of the present invention. The ferrule 61 is comprised by a hard, high precision plastic such as an engineering plastic and is formed, for example, by injection molding. Reference numeral 23 is a pin hole, 26 a tape-like cable, and 27a and 27c are optical fibers.

Figure 2:
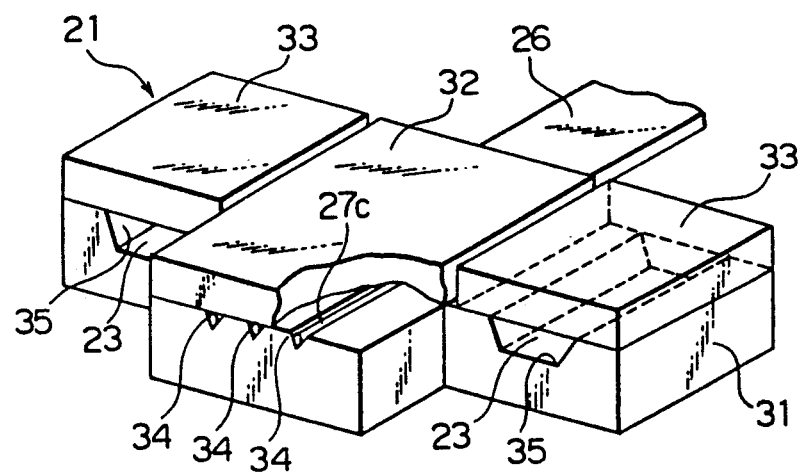
FIGS. 2(a) and (b) are a perspective view and frontal view showing an example of a ferrule used in the optical switching connector.
Figure 2:
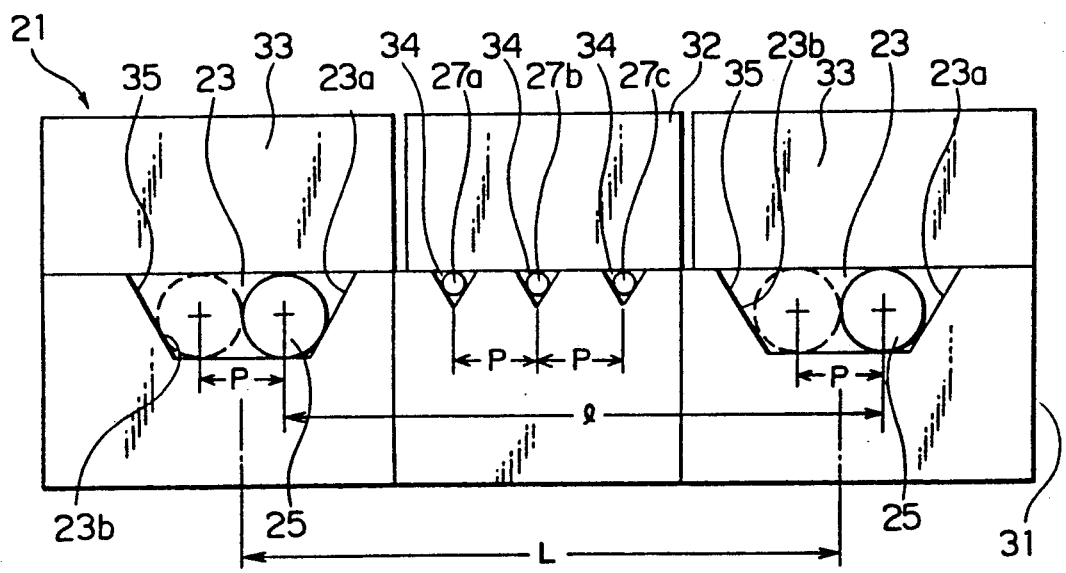
Figure 5:
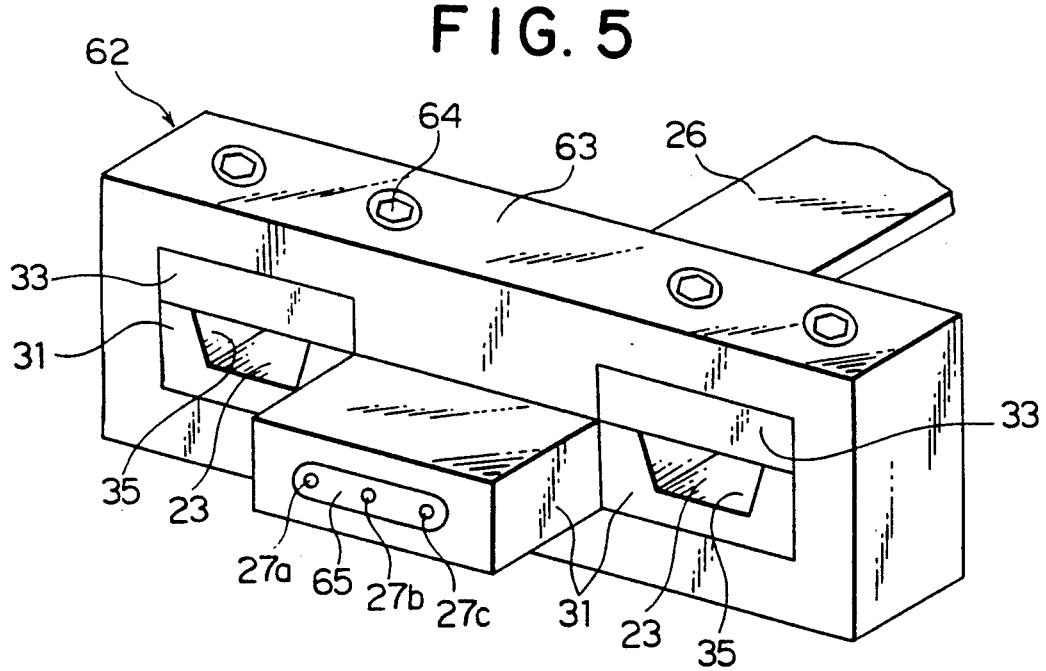

FIG. 5 shows a still other example of a ferrule used in the optical switching connector of the present invention. In this ferrule 62, a base plate 31 and two side cover plates 33 as shown in FIG. 2 are fit into a housing 63 and affixed by bolts 64. At the center portion of the base plate 31 there are formed not V-shaped grooves, but a hole with an elongated sectional shape, in which is formed an engineering plastic or other high precision plastic 65 by insert molding etc. This plastic has formed in it fine holes for insertion of the optical fibers 27a to 27c. These fines holes are formed by using molding pins etc. during the insert molding.

FIGS. 6(a) to (c) are views showing other examples of the pin holes formed in the ferrule. FIG 6(a) shows an example of a pin hole 23 formed to be an elongated triangle. FIG. 6(b) shows an example of a pin hole 23 formed to be an elongated diamond, and FIG. 6(c) shows an example of a pin hole 23 formed to be an elongated rectangle. The pin holes 23 in which the reference pins 25 are inserted are not limited to those with such sectional shapes and may be of various other shapes as well.

FIG. 7 shows another example of the support table used in the optical switching connector of the present invention. In the support table 41 shown in FIG. 3, the reference pins 25 were positioned by placing them in the V-shaped grooves formed in the support table 41. As opposed to this, in this embodiment, the support table 66 has support holes 67 formed in it, through which reference pins (not shown) are inserted to be supported. By making such a construction, it is possible to make the support table 66 by injection molding plastic.

Figure 8:
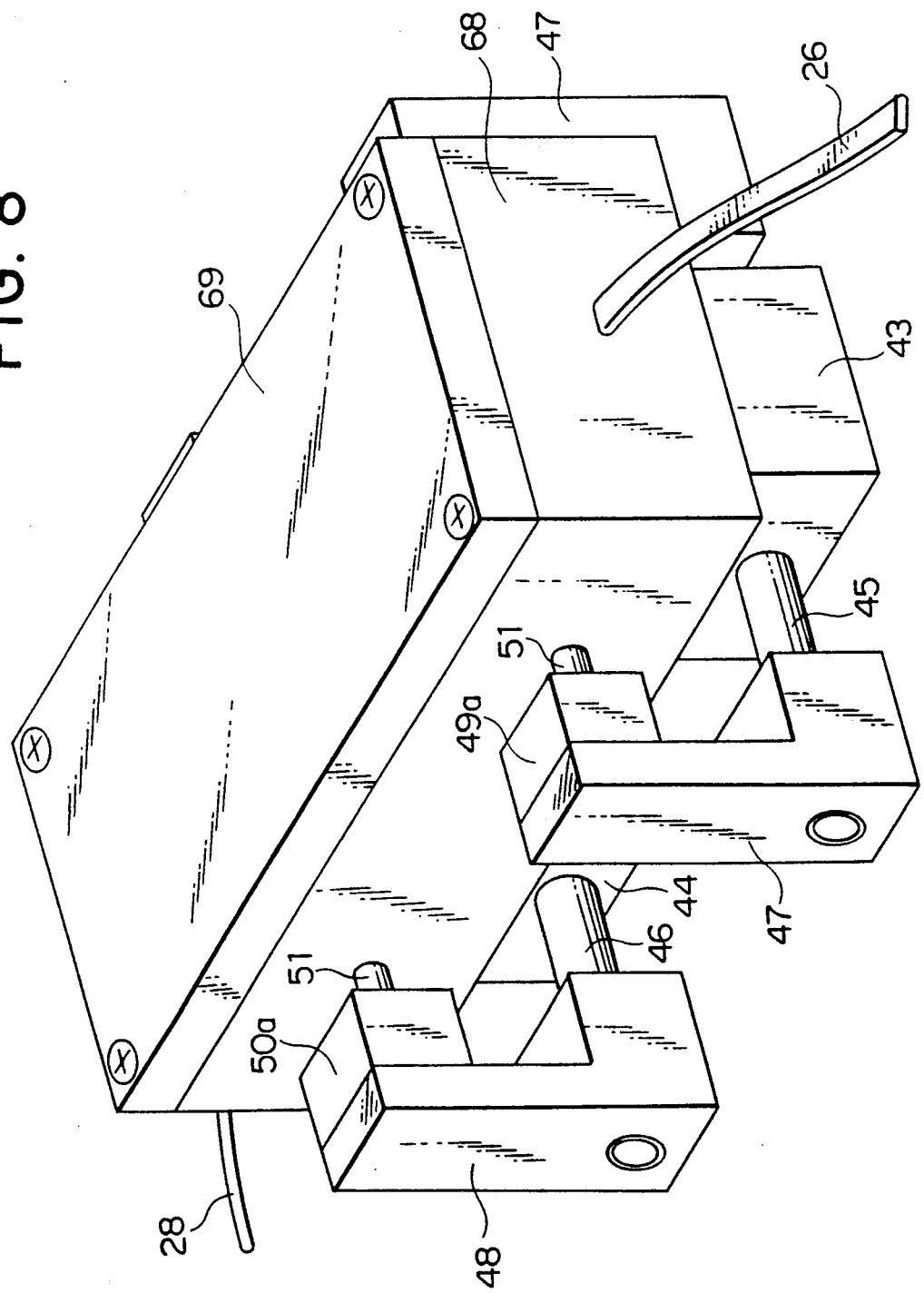
FIG. 8 is a perspective view showing another embodiment of an optical switching connector according to the present invention.
Figure 9:
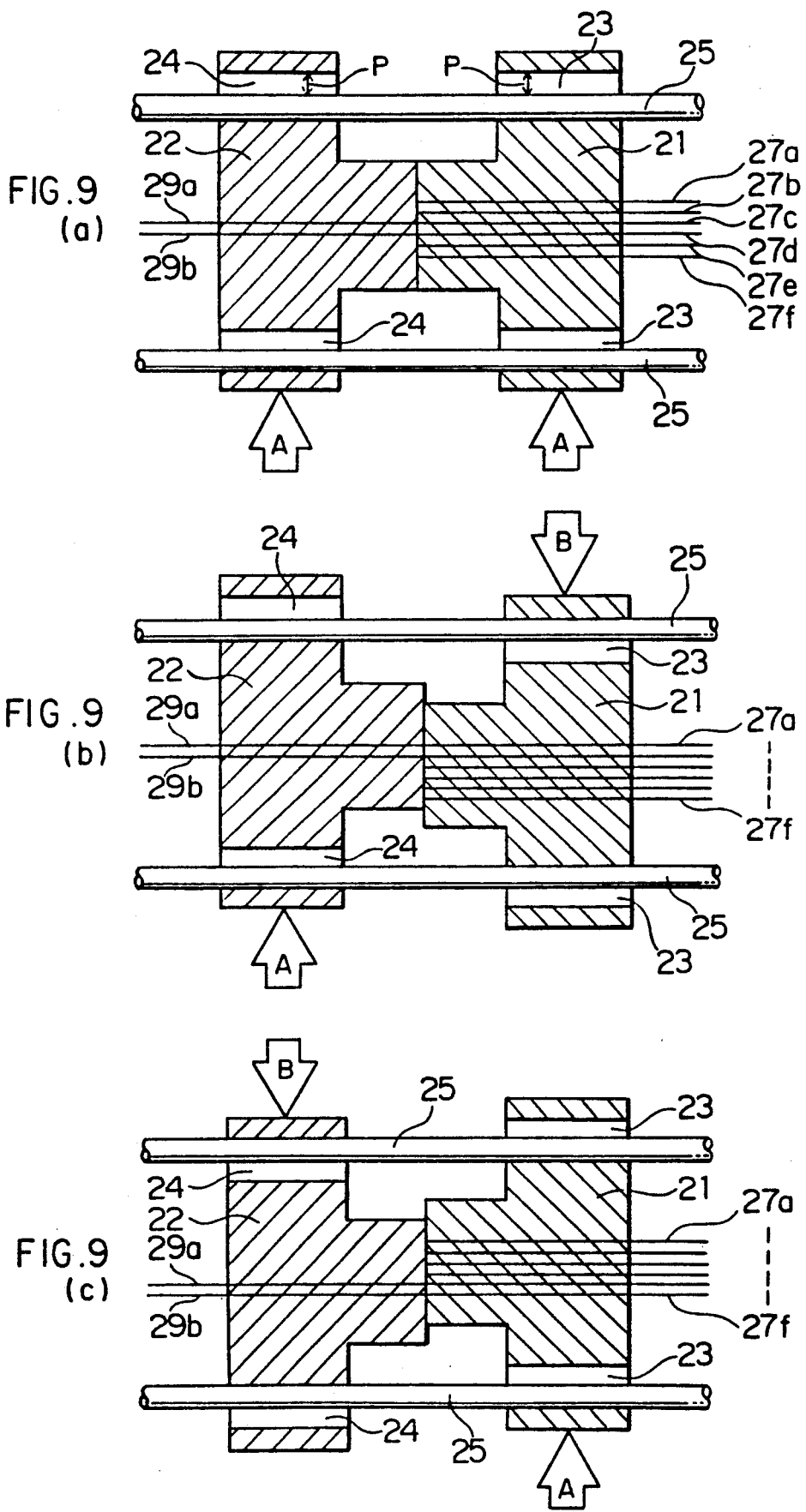

FIG. 8 shows another embodiment of the optical switching connector of the present invention. This optical switching connector is made of a dust-proof construction by covering the ferrules 21 and 22, reference pins 25, and supports table 41 of the optical switching connector shown in FIG. 3 with a box and cover 69. The other parts of the construction are the same as in the embodiment shown in FIG. 3 and the same portions are given the same reference numerals.

FIG. 9 to FIG. 12 show other examples of the switching pattern of the optical switching connector according to the present invention. FIGS. 9(a) to (c) correspond to the states of (a) to (c) in FIG. 1.

In FIGS. 9(a) to (c) the first ferrule 21 has six optical fibers 27a to 27f affixed at pitches of ½ of the movement pitch P of the ferrule 21, while the second ferrule 22 has two optical fibers 29a and 29b affixed at the same pitch. By doing this, as shown in (a) to (c) of the figure, it is possible to perform switching of the optical paths of 2 vs. 6 optical fibers in three stages.

By the same method as this, for example, the first ferrule may have nine optical fibers affixed to it at a pitch of ⅓ of the ferrule movement pitch P and the second ferrule may have three optical fibers affixed at the same pitch, whereby it is possible to perform switching of the optical paths of 3 vs. 9 optical fibers in three stages.

In the embodiment shown in FIGS. 10(a) to (c) the first and second ferrules 21 and 22 have six optical fibers 27a to 27f and 29a to 29f affixed to them at a pitch the same as the ferrule movement pitch P so that as shown in FIGS. 10(a) to (c), 6 vs. 6 switching is performed in three stages.

In the embodiment shown in FIGS. 11(a) to (c), the first and second ferrules 21 and 22 have two optical fibers 27a, 27b and 29a, 29b affixed to them at a pitch the same as the ferrule movement pitch P so that as shown in FIGS. 11(a) to (c), 2 vs. 2 switching is performed in three stages.

In the embodiment shown in FIGS. 12(a) to (c) the ferrule 21 has two optical fibers 27a and 27b affixed to them at a pitch the same as the movement pitch P of the ferrule 21 and the second ferrule 22 has a single optical fiber 29 affixed to it, so that 1 vs. 2 switching, including non-connection, is performed in three stages.

Next, an explanation will be made of an embodiment of an optical switching connector enabling switching in four stages.

The optical switching connector according to the embodiment shown in FIGS. 13(a) to (d) is provided with a first ferrule 121 and second ferrule 122 disposed with their end faces abutting on each other and two reference pins 125 disposed in parallel at a predetermined interval.

Figure 16:
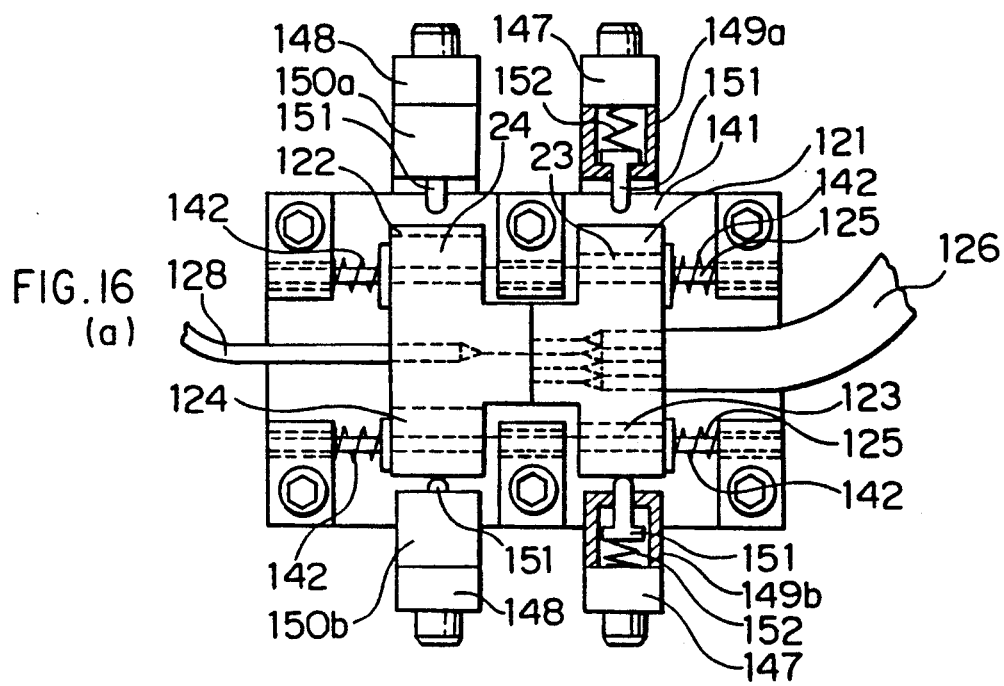
FIGS. 16(a) to (c) are a plan view, side view, and rear view showing the overall construction of the above optical switching connector including the drive system.
Figure 16:
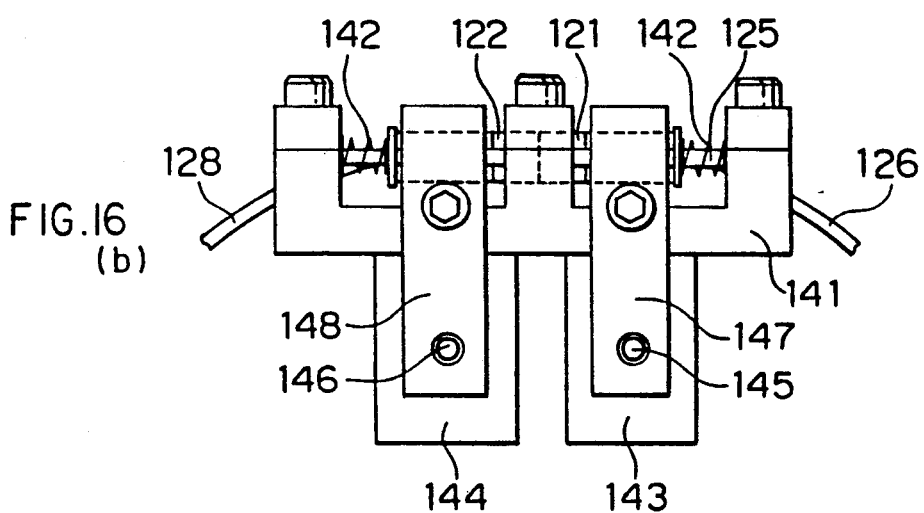
Figure 16:
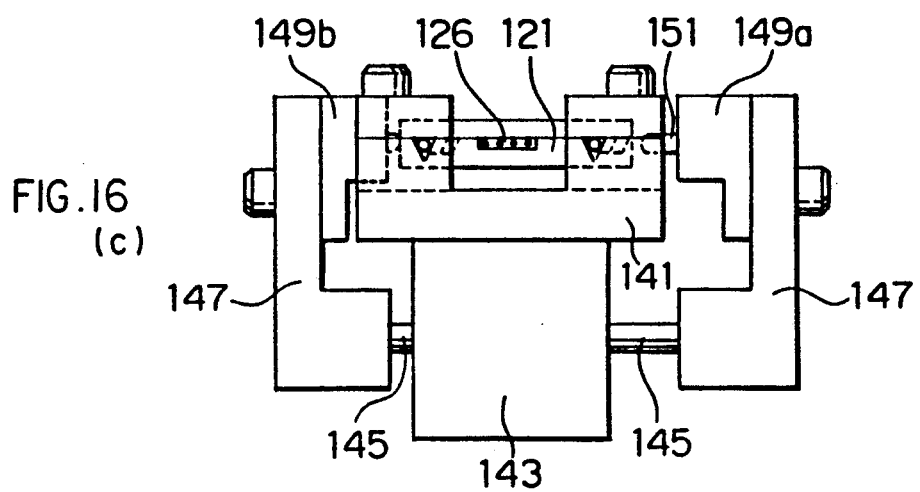

The first and second ferrules 121 and 122 each have two parallel pin holes 123 and 124, which pin holes 123 and 124 have the above two reference pins 125 inserted through them. The two reference pins 125 are affixed to the support table 141 shown in FIG. 16, for example.

The pin holes 123 of the first ferrule 121 are elongated in sectional shape so as to allow lateral movement of the ferrule 121 by exactly a certain pitch P with respect to the reference pins 125. Further, the pin holes 124 of the second ferrule 122 are elongated in sectional shape so as to allow lateral movement of the ferrule 122 by exactly a certain pitch 2P with respect to the reference pins 125.

The first ferrule 121 has four optical fibers 127a to 127d affixed by a pitch the same as the movement pitch P of the reference pines 125 in the pin holes 123, while the second ferrule 122 has one optical fiber 129 affixed to it to oppose the same.

The positional relationship of the optical fibers 127a to 127d and the optical fiber 129, as shown in FIG. 13(a) is such that when the first and second ferrules 121 and 122 are pushed in the direction of the arrow A and one of the inside surfaces 123a and 124a of the pin holes 123 and 124 are pressed against the reference pins 125 in position, the optical axes of the optical fiber 129 and the optical fiber 127c coincide.

When, as shown in FIG. 13(b) of the figure, just the first ferrule 121 is pressed in the direction of the arrow B from this state, the first ferrule 121 moves laterally by exactly the predetermine pitch P, the other inside surfaces 123b of the pin holes 123 are pressed against the pin holes 125, and the position is thus set. In this state, the optical fiber 129 coincides in optical axis with the optical fiber 127d.

Further, as shown in FIG. 13(c) when just the second ferrule 122 is pushed in the direction of the arrow B from the state of (a) of the figure, the second ferrule 122 moves laterally by exactly the predetermined pitch 2P, the other inside surfaces 124b of the pin holes 124 are pressed against the reference pins 125, and the position is thus set. In this state, the optical fiber 129 coincides in optical axis with the optical fiber 127a.

When, as shown in FIG. 13(d), the first ferrule 121 is pressed in the direction of the arrow B from the state of (c) of the figure, the first ferrule 121 moves laterally by exactly the predetermined pitch P, the other inside surfaces 123b of the pin holes 123 are pressed against the pin holes 125, and the position is thus set. In this state, the optical fiber 129 coincides in optical axis with the optical fiber 127b.

The optical switching connector of the present invention can switch the optical paths in four stages as explained above.

Next, a specific example of the ferrule used in the optical switching connector able to switch in four stages will be explained with reference to FIGS. 14(a) and (b) and FIGS. 15(a) and (b).

FIG. 14(a) and (b) show the first ferrule 121. The ferrule 121 is comprised of a base plate 131 and a center cover plate 132 and two side cover plates 133 fixed adhered to the top of the plate 131. The base plate 131 has four V-shaped grooves 134 in the top center portion at a predetermined pitch P and has trapezoidal grooves 135 formed in parallel at the two sides thereof. The V-shaped grooves 134 have four optical fibers 127a to 127d of a tape-like cable 126 laid in them and are covered by the center cover plate 132 affixed and adhered at the top. This enables the four optical fibers 127a to 127d to be affixed in a certain position. Further, the portions of the base plate 131 where the trapezoidal grooves 135 are formed have the two side cover plates 133 affixed adhered to the top. The pin holes 123 are defined by the two side cover plates 133 and the trapezoidal grooves 135.

The pin holes 123 have reference pins 125 inserted in them as shown in FIG. 14(b). The reference pins 125 can move laterally relative to the ferrule 121 in the pin hole 123. The center distance L between the two pin holes 123 is formed so as to accurately match the center distance l of the two reference pins 125. Further, the range of possible movement of the reference pins 125 in the pin holes 123 is designed to be within the range of a predetermined pitch P from the position (solid line)

where the reference pins 125 abut against one of the inside surfaces 123a of the pin holes 123 to the position where they abut against the other of the inside surfaces 123b (broken line). The four V-shaped grooves 134 are formed on the base plate 131 at a pitch P the same as this.

FIGS. 15(a) and (b) show a second ferrule 122. The ferrule 122 is comprised of a base plate 136 and a center cover plate 137 and two side cover plates 138 fixed adhered to the top of the same. The base plate 136 has a single V-shaped groove 139 in the top center portion and has trapezoidal grooves 140 formed in parallel at the two sides thereof. The V-shaped groove 139 has an optical fiber 129 of a single-core optical fiber cable 128 laid in it and are covered by the center cover plate 137 affixed and adhered at the top. This enables the optical fiber 129 to be affixed in a certain position. Further, the portions of the base plate 136 where the trapezoidal grooves 140 are formed have the two side cover plates 138 affixed adhered to the top. The pin holes 124 are defined by the two side cover plates 138 and the trapezoidal grooves 140.

The pin holes 124 have reference pins 125 inserted in them as shown in FIG. 15(b). The reference pins 125 can move laterally relative to the ferrule 122 in the pin holes 124. The relationship between the two pin holes 124 and the reference pins 125 is the same as the relationship between the pin holes 123 and the reference pins 125 shown in FIG. 14(b) except that the reference pins 125 can move in the pin holes 124 laterally at a pitch 2P twice the movement pitch P of the reference pins 125 in the pin holes 123 of the first ferrule 121 shown in FIG. 14(b).

Note that the base plates 131 and 136 are formed, for example, by ultraprecision grinding of ceramic or ultrahard alloy, by chemical etching of silicon monocyrstalline substrates, etc. since a particularly high dimensional precision is required.

FIGS. 16(a) to (c) show the overall construction of an optical switching connector including the driving system of the first and second ferrules.

The two reference pins 125 inserted in the pin holes 123 and 124 of the first and second ferrules 121 and 122 are fixed and supported at the two end and the center portion to a support table 141. Further, the rear end faces of the first and second ferrules 121 and 122 and the two side support portions of the support table 141 have inserted between them compression type coil springs 142. The two ferrules 121 and 122 are made to press against each other at the front end faces by the repulsion force of the spring 142.

On the other hand, at the bottom of the support table 141 are affixed first and second solenoids 143 and 144 corresponding to the first and second ferrules 121 and 122. These solenoids 143 and 144 are bistable type solenoids where plungers 145 and 146 move back and forth in a direction perpendicular to the reference pins 125. At the two ends of the plungers 145 and 146 are affixed rising pieces 147 and 148. At the top end portions of the rising pieces 147 and 148 are affixed push heads 149a, 149b, 150a, and 150b which push the side surfaces of the ferrules 121 and 122. The push heads 149a, 149b, 150a, and 150b have forward and reverse movable push pins 151, which push pins 151 are biased in the forward (protruding) direction at all times by the compression springs 152 in the push heads.

The reciprocal movement stroke of the plungers 145 and 146 of the solenoids 143 and 144 is set to an extent so that when the push heads 149a and 150a push the ferrules 121 and 122, their push pins 151 pull back to the intermediate position and conversely when the push heads 149b and 150b push the ferrules 121 and 122, their push pins 151 pull back to the intermediate position.

In FIGS. 16(a), the push heads 149a and 150a push the ferrules 121 and 122, giving the same state as in FIG. 13(d). If the first solenoid 143 is operated in the reverse direction from this state, then the push head 149a will push the first ferrule 121 from the opposite side and move the same laterally, so the state of FIG. 13(c) will result. Further, if the second solenoid 144 is operated in the reverse direction from the state of FIG. 16(a), the push head 150a will push the second ferrule 122 from the opposite side and move the same laterally, so the state of FIG. 13(b) will result. If the first solenoid 143 is operated in the reverse direction from this state, then the push head 149a will push the first ferrule 121 from the opposite side and move the same laterally, so the state of FIG. 13(a) will result.

The optical switching connector can switch in four stages as mentioned above.

Figure 17:
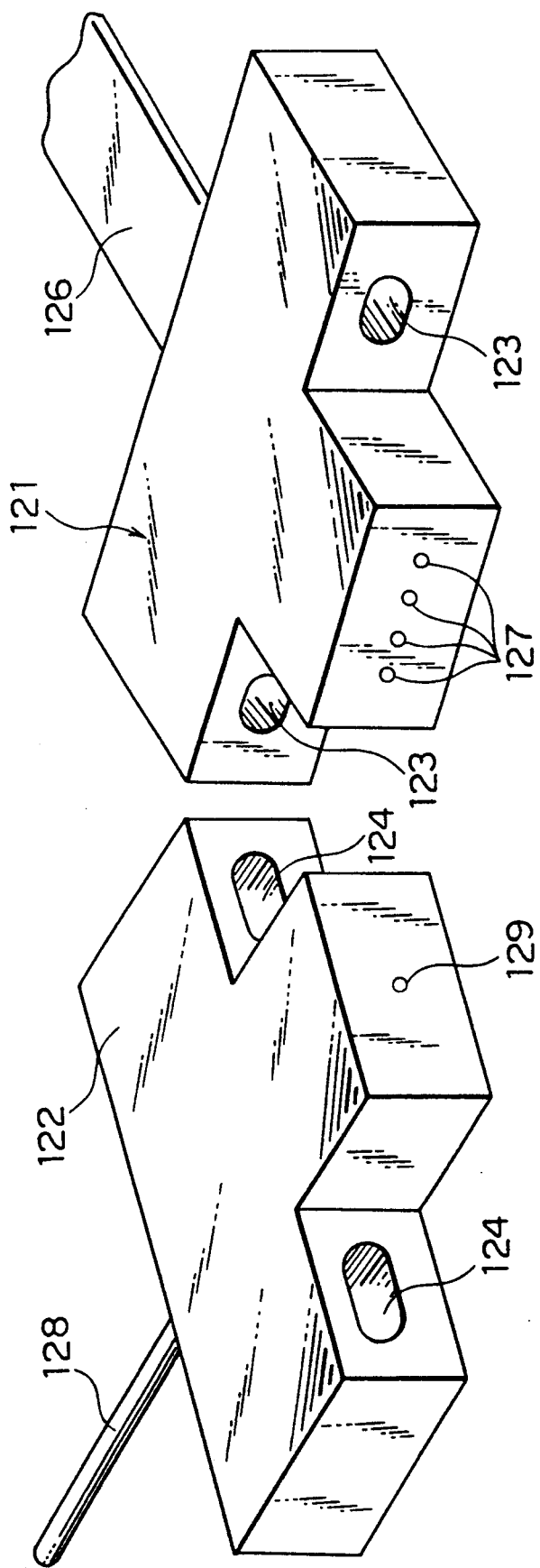
FIG. 17 and FIG. 18 are perspective views showing other examples of a ferrule used in the optical switching connector of the present invention.

FIG. 17 shows another example of the ferrule able to switch in four stages. The first and second ferrules 121 and 122 are comprises by a hard, high precision plastic such as an engineering plastic and is formed, for example, by molding. Reference numerals 123 and 124 are pin holes, 126 a tape-like cable, 127a to 127c optical fibers, 128 a single core optical fiber cable, and 129 an optical fiber.

Figure 14:
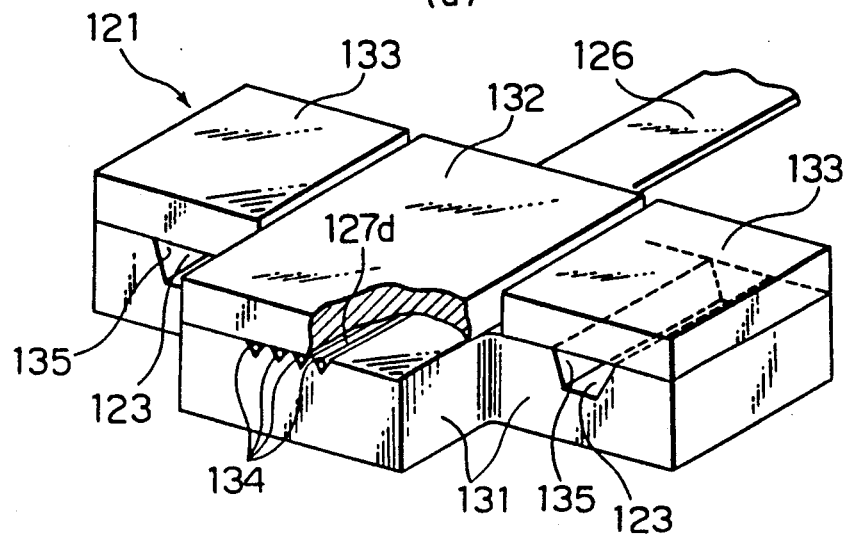
FIGS. 14(a) and (b) are a perspective view and frontal view of a first ferrule used in the optical switching connector.
Figure 14:
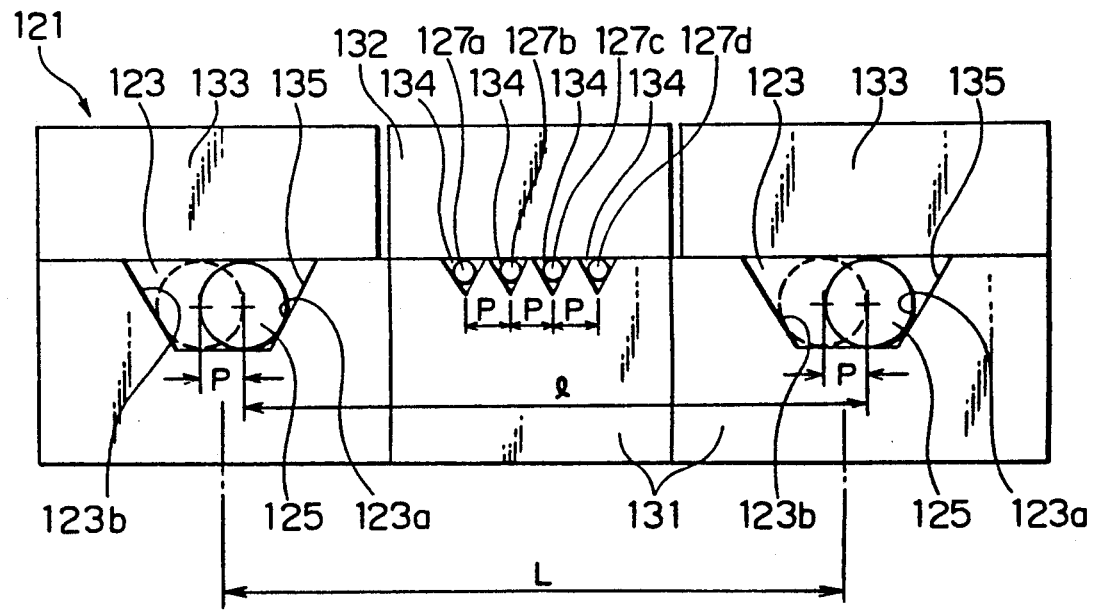
Figure 15:
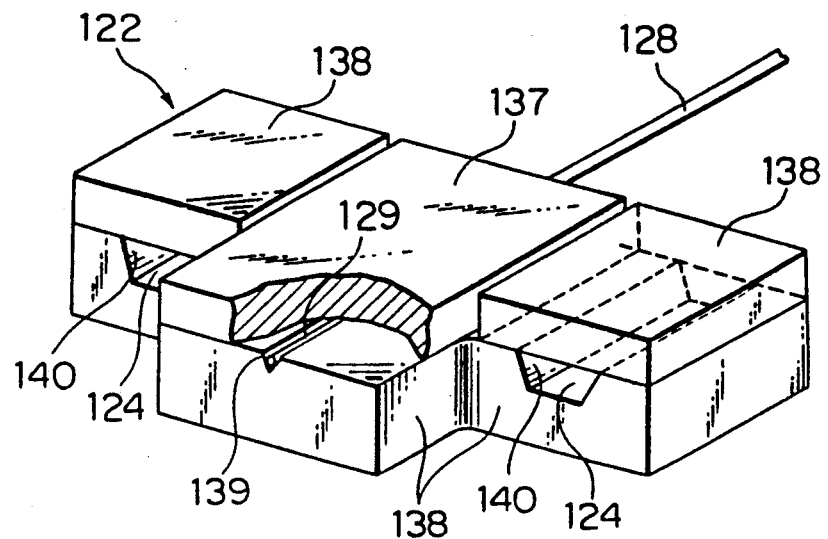
FIGS. 15(a) and (b) are a perspective view and front view showing a second ferrule.
Figure 15:
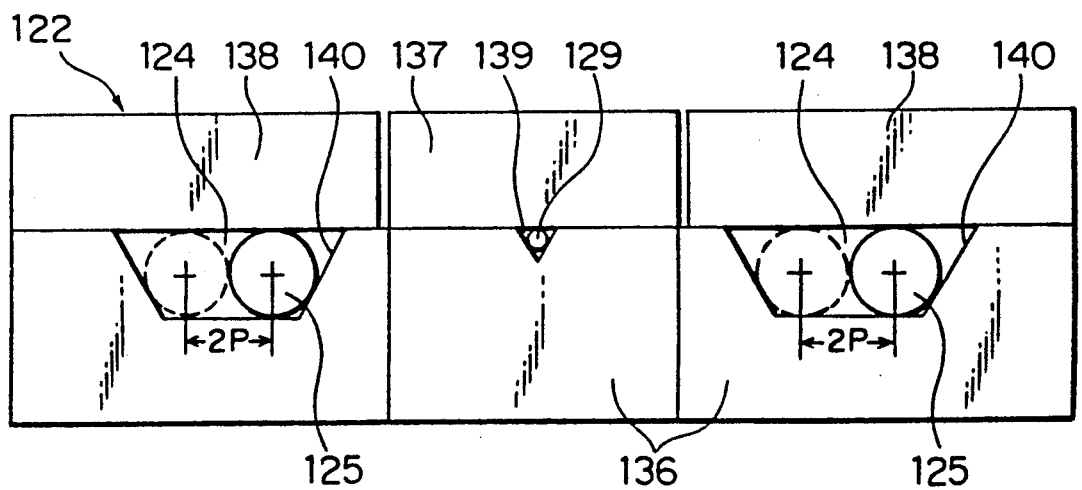
Figure 18:
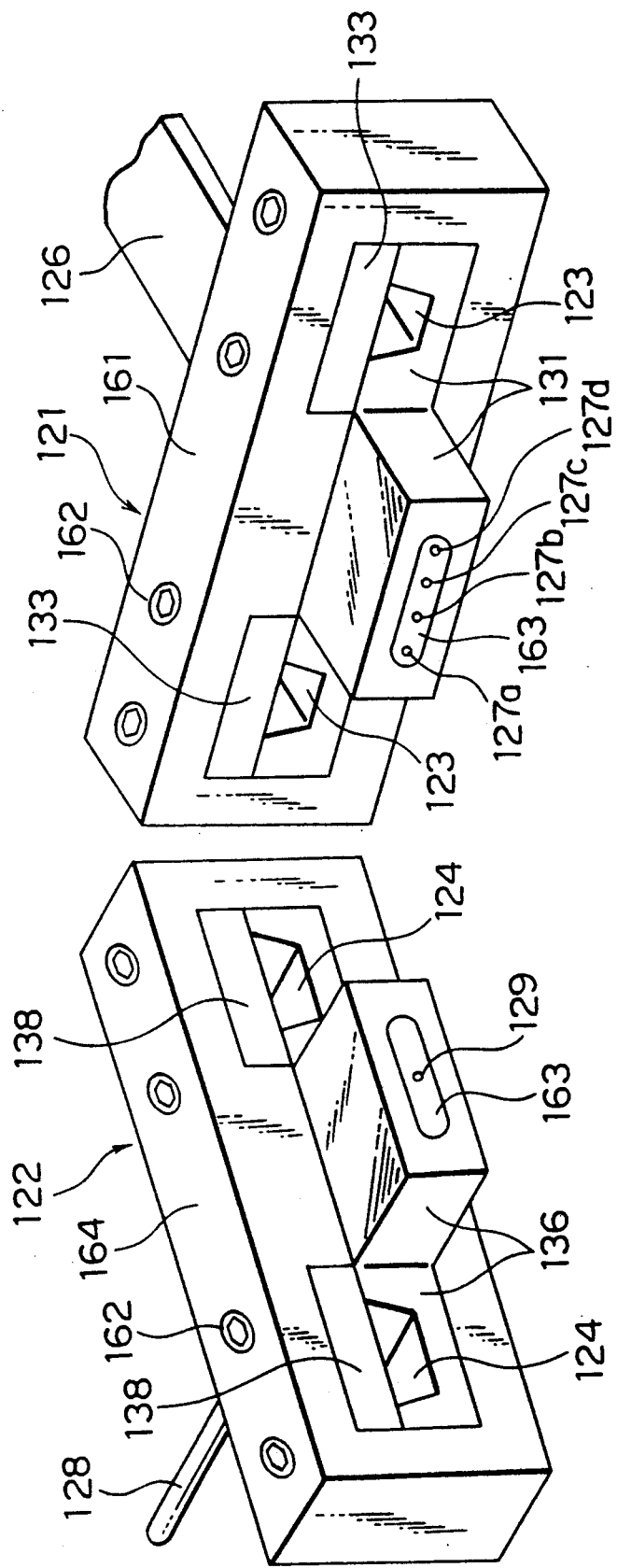
Figures 19A, 19B:
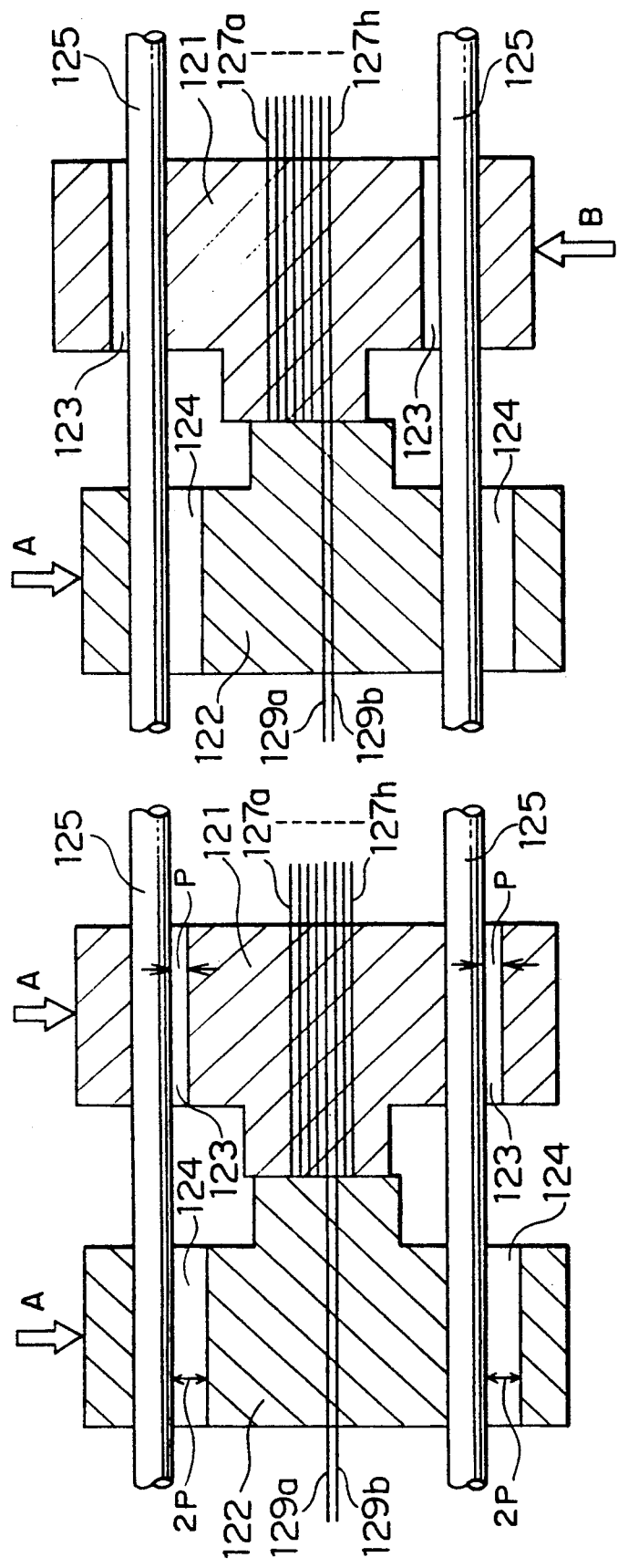
Figure 20A:
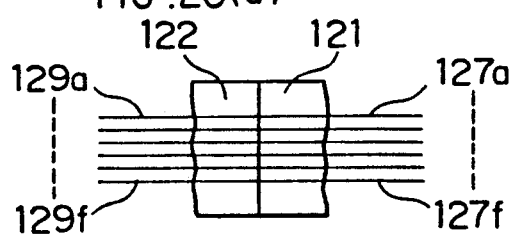
Figure 20B:
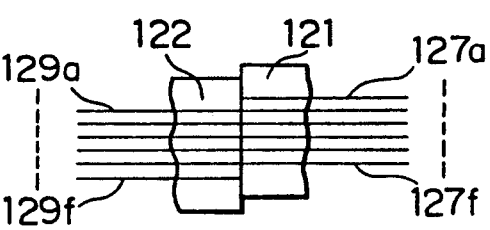
Figure 20C:
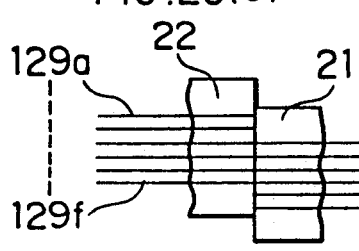
Figure 20D:
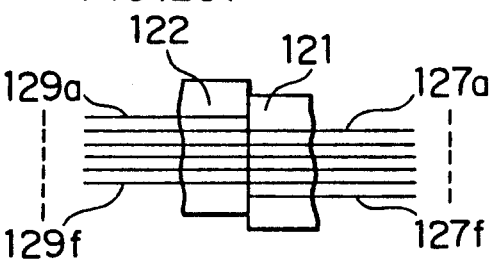
Figure 21A:
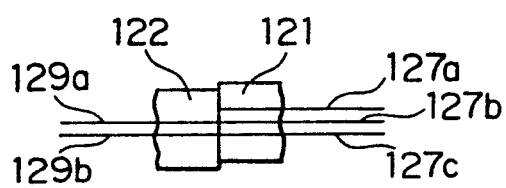
Figure 21B:
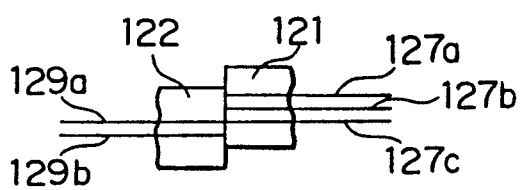
Figure 21C:
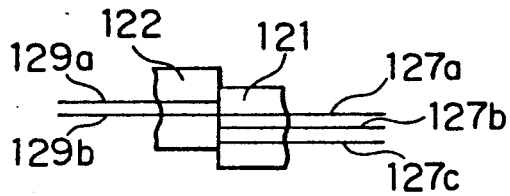
Figure 21D:
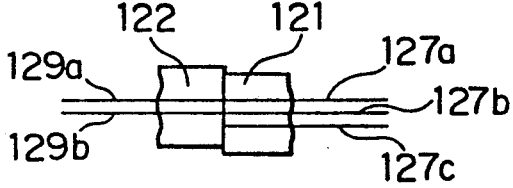
Figure 22A:
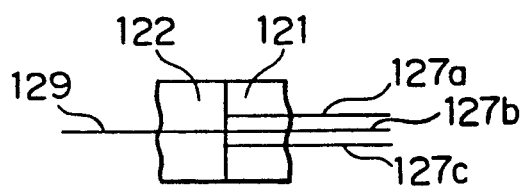
Figure 22B:
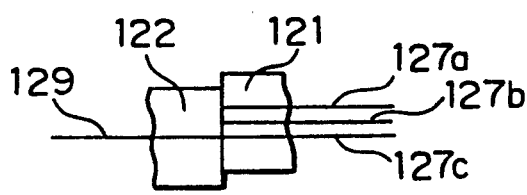
Figure 22C:
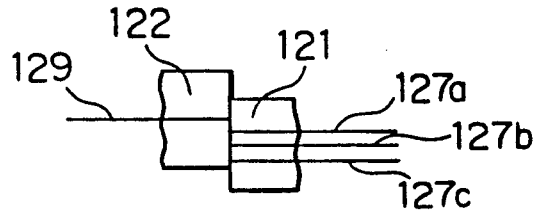
Figure 22D:
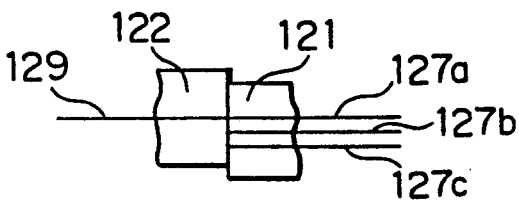
Figure 23A:
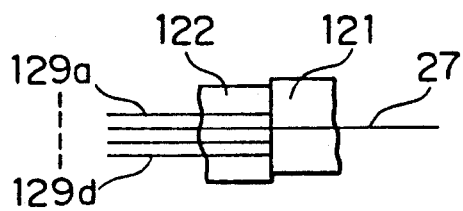
Figure 23B:
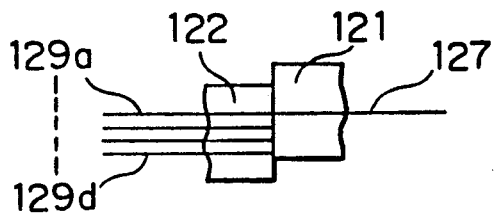
Figure 23C:
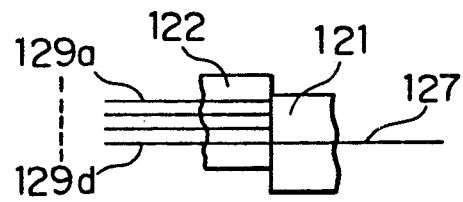
Figure 23D:
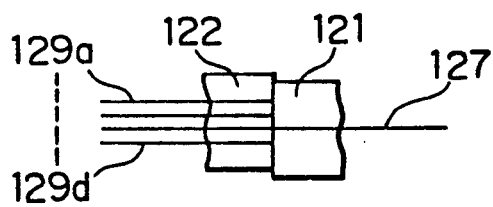
Figure 24A:
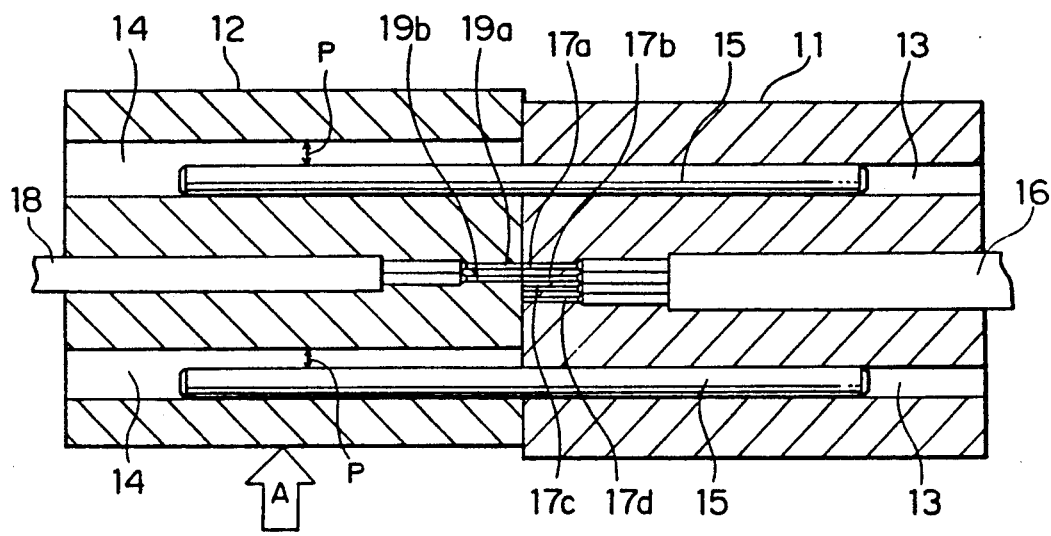
Figure 24B:
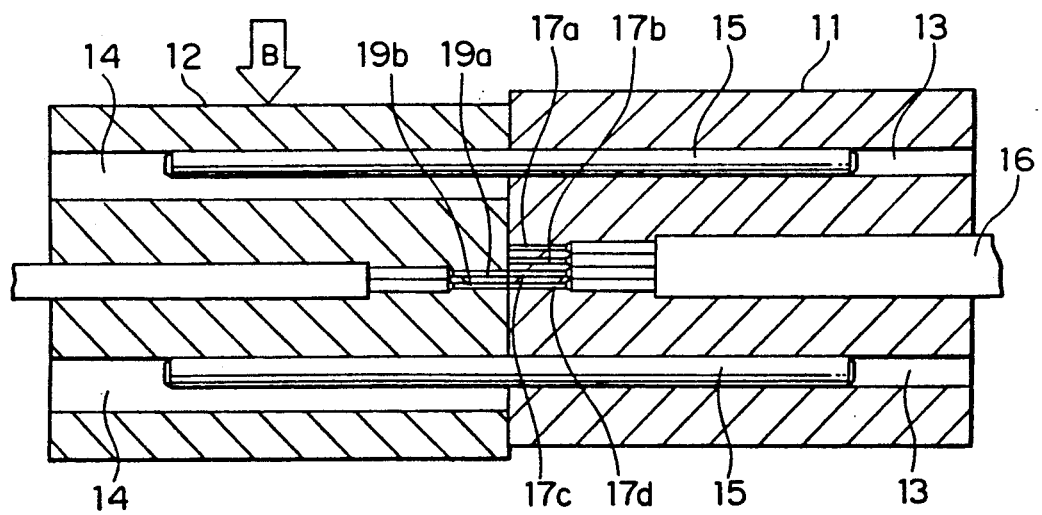

FIG. 18 shows a still other example of a ferrule used in the optical switching connector able to switch in four stages. In this ferrule 121, a base plate 131 and two side cover plates 133 as shown in FIG. 14 are fit into a housing 161 and affixed by bolts 162. At the center portion of the base plate 131 there are formed no V-shaped grooves, but a hole with an elongated sectional shape, in which is filled an engineering plastic or other high precision plastic 163. This plastic 163 is formed, for example, by insert molding and has formed in it fine holes for insertion of the optical fibers 127a to 127d. In the second ferrule 122 too, a base plate 136 and two side cover plates 138 as shown in FIG. 15 are fit into a housing 164 and affixed by bolts 165. At the center portion of the base plate 165 there are formed no V-shaped grooves, but a hole with an elongated sectional shape, in which is filled an engineering plastic or other high precision plastic 163. This plastic 163 is formed, for example, by insert molding and has formed in it a fine hole for insertion of the optical fiber 129.

The shape of the pin holes formed in the ferrules is not particularly limited, but the various shapes shown in FIG. 6 may be used. Further, the support table used in the optical switching connector able to switch in four stages is not particularly limited, and the support table 41 shown in FIG. 7 may be used. With such a construction, it is possible to produce the support table 41 by injection molding and to keep costs low. Further, like with the optical switching connector able to switch in three stages, the connector may be made a dust-proof construction as shown in FIG. 8.

FIG. 19(a) to FIG. 23 show other examples of a switching pattern of an optical switching connector able to switch in four stages according to the present invention. FIGS. 19(a) to (d) correspond to the states (a) to (d) of FIG. 13.

In the embodiment shown in FIGS. 19(a) to (d), the first ferrule 121 has eight optical fibers 127a to 127h affixed at a pitch of ½ of the movement pitch P of the ferrule 121, while the second ferrule 122 has two optical fibers 129a and 129b fixed at the same pitch. By doing this, as shown in FIGS. 19(a) to (d), it is possible to switch the optical paths of 2 vs. 8 optical fibers in four stages.

If, by the same method, the first ferrule has 12 optical fibers affixed to it at a pitch of ½ of the movement pitch P of the ferrule and the second ferrule has three optical fibers affixed at the same pitch, it is possible to perform switching of optical paths of 3 vs. 12 optical fibers in four stages.

In the embodiment shown in FIGS. 20 (a) to (d) the first and second ferrules 121 and 122 each have six optical fibers 127a to 127f and 129a to 129f affixed at the same pitch as the movement pitch P of the first ferrule 121 to perform 6 vs. 6 switching in four stages as shown in (a) to (d) of the figure.

In the embodiment shown in FIGS. 21(a) to (d) the first ferrule 121 has three optical fibers 127a to 127c and the second ferrule 122 has two optical fibers 129a and 129b affixed at the same pitch as the movement pitch P of the first ferrule 121, to enable 2 vs. 3 switching in four stages as shown in FIGS. 21(a) to (d). In this switching method, it becomes possible for any optical fiber to connect with all opposing optical fibers.

In the embodiment shown in FIGS. 22(a) to (d), the first ferrule 121 has three optical fibers 127a to 127c affixed at the same pitch as the movement pitch P of the ferrule 121, while the second ferrule 122 has one optical fiber 129 affixed to enable 1 vs. 3 switching, including nonconnection, in four stages.

In the embodiment shown in FIGS. 23(a) to (d), the first ferrule 121 has one optical fiber 127 affixed to it and the second ferrule 122 has four optical fibers 129a to 129d affixed to it at the same pitch as the movement pitch P of the first ferrule 121. That is, the numbers of the optical fibers affixed to the first and second ferrules 121 and 122 are reverse to the case of FIG. 13. In this way, even if the numbers of optical fibers affixed to the first and second ferrules are reverse in the above embodiments, the same four stage switching is possible.

Note that in the embodiments shown in FIGS. 13 to 23, the movement pitch P of the reference pins 125 in the pin holes 124 formed in the second ferrule 122 was made to be twice the movement pitch P of the reference pins 125 in the pin holes 123 formed in the first ferrule 121, but in this invention, it may be made so that other multiples are attained.

We claim:

1. An optical switching connector comprising a first ferrule and second ferrule disposed with end faces thereof abutting on each other and two reference pins disposed in parallel at a predetermined interval,
   the first and second ferrules having two parallel pin holes, respectively, the two reference pins being inserted in the pin holes in each of the first and second ferrules,
   one of the first and second ferrules having fixed therein two or more optical fibers at a predetermined fiber pitch, the other ferrule having fixed therein one or more optical fibers at the same fiber pitch,
   each of the pin holes of the first ferrule having an elongated sectional shape enabling the reference pins to move laterally by a movement pitch equal to $n_1$ times the fiber pitch (where $n_1$ is a positive integer),
   each of the pin holes of the second ferrule having an elongated sectional shape enabling the reference pins to move laterally by a movement pitch equal to $n_2$ times the fiber pitch (where $n_2$ is a positive integer),
   the first and second ferrules being able to be positioned at one position determined by one of the inside surfaces of the pin holes being pressed against the reference pins and another position determined by the other inside surfaces of the pin holes being pressed against the reference pins.

2. An optical switching connector as set forth in claim 1, wherein the movement pitch of the reference pins in the pin holes formed in the first ferrule and the movement pitch of the reference pins in the pin holes formed in the second ferrule are the same.

3. An optical switching connector as set forth in claim 1, wherein each of the ferrules has a base plate with a pair of trapezoidal grooves formed separated by a predetermined distance in the top s which are affixed by adhesion to the top surface of the base plate, the trapezoidal space surrounded by the base plate and the cover plates constituting the said pin holes.

4. An optical switching connector as set forth in claim 1, wherein the said reference pins are affixed to the two ends and the centers to a support table.

5. An optical switching connector as set forth in claim 1, wherein the ferrules are moved in the perpendicular direction with respect to the axial lines of the reference pins by push heads driven by solenoids.

6. An optical switching connector as set forth in claim 1, wherein the ferrules and reference pins are covered by a box member and cover member to form a dustproof construction.

7. An optical switching connector
   comprising a first ferrule and second ferrule disposed with end faces thereof abutting on each other and two reference pins disposed in parallel at a predetermined interval,
   the first and second ferrules having two parallel pin holes, respectively, the two reference pins being inserted in the pin holes in each of the first and second ferrules,
   one of the first and second ferrules having fixed therein three of more optical fibers at a predetermined fiber pitch, the other ferrule having fixed therein one or more optical fibers at the same fiber pitch,
   each of the pin holes of the first ferrule having an elongated sectional shape enabling the reference pins to move laterally by a movement pitch equal to $n_1$ times the fiber pitch (where $n_1$ is a positive integer),
   each of the pin holes of the second ferrule having an elongated sectional shape enabling the reference pins to move laterally by a movement pitch equal to $n_2$ times the fiber pitch (where $n_2$ is a positive integer),
   the first and second ferrules being able to be positioned at one position determined by one of the inside surfaces of the pin holes being pressed against the reference pins and another position determined by the other inside surfaces of the pin holes being pressed against the reference pins.

8. An optical switching connector as set forth in claim 7, wherein the movement pitch of the reference pins in the pin holes formed in the first ferrule and the movement pitch of the reference pins in the pin holes formed in the second ferrule are different.

9. An optical switching connector as set forth in claim 7, wherein the movement pitch of the reference pins in the pin holes formed in the first ferrule in two times the movement pitch of the reference pins in the pin holes formed in the second ferrule.

10. An optical switching connector as set forth in claim 7, wherein each of the ferrules has a base plate with a pair of trapezoidal grooves formed separated by a predetermined distance in the top s which are affixed by adhesion to the top surface of the base plate, the trapezoidal space surrounded by the base plate and the cover plates constituting the said pin holes.

11. An optical switching connector as set forth in claim 7, wherein the said reference pins are affixed at the two ends and the centers to a support table.

12. An optical switching connector as set forth in claim 7, wherein the ferrules are moved in the perpendicular direction with respect to the axial lines of the reference pins by push heads driven by solenoids.

13. An optical switching connector as set forth in claim 7, wherein the ferrules and reference pins are covered by a box member and cover member to form a dustproof construction.

* * * * *